US012081961B2

(12) United States Patent
Namba et al.

(10) Patent No.: US 12,081,961 B2

(45) Date of Patent: Sep. 3, 2024

(54) SIGNAL PROCESSING DEVICE AND METHOD

(71) Applicant: SONY GROUP CORPORATION, Tokyo (JP)

(72) Inventors: Ryuichi Namba, Tokyo (JP); Makoto Akune, Tokyo (JP); Yoshiaki Oikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 43 days.

(21) Appl. No.: 17/774,379

(22) PCT Filed: Oct. 30, 2020

(86) PCT No.: PCT/JP2020/040798

§ 371 (c)(1), (2) Date: May 4, 2022

(87) PCT Pub. No.: WO2021/095563

PCT Pub. Date: May 20, 2021

(65) Prior Publication Data

US 2022/0360930 A1 Nov. 10, 2022

(30) Foreign Application Priority Data

Nov. 13, 2019 (JP) ................................ 2019-205113

(51) Int. Cl.

*H04S 7/00* (2006.01)
*H04R 1/40* (2006.01)

(52) U.S. Cl.

CPC ............... *H04S 7/302* (2013.01); *H04R 1/40* (2013.01); *H04S 2400/11* (2013.01); *H04S 2400/15* (2013.01)

(58) Field of Classification Search

CPC ......................... H04S 2400/15; H04S 2420/11

See application file for complete search history.

(56) References Cited

U.S. PATENT DOCUMENTS

| | | | | |
|---|---|---|---|---|
| 2015/0208171 | A1 | 7/2015 | Funakoshi | |
| 2017/0311080 | A1* | 10/2017 | Kolb | H04N 23/698 |
| 2020/0228913 | A1* | 7/2020 | Herre | H04S 7/303 |

FOREIGN PATENT DOCUMENTS

| | | | |
|---|---|---|---|
| JP | 2015-139162 | A | 7/2015 |
| WO | 2015/107926 | A1 | 7/2015 |
| WO | 2019/188394 | A1 | 10/2019 |

OTHER PUBLICATIONS

International Search Report and Written Opinion of PCT Application No. PCT/JP2020/040798, issued on Jan. 19, 2021, 08 pages of ISRWO.

* cited by examiner

*Primary Examiner* — Ping Lee

(74) *Attorney, Agent, or Firm* — CHIP LAW GROUP

(57) ABSTRACT

The present technology relates to a signal processing device, a method, and a program that make it possible for a user to obtain a higher realistic feeling. The signal processing device includes: an audio generation unit that generates a sound source signal according to a type of a sound source on the basis of a recorded signal obtained by sound collection by a microphone attached to a moving object; a correction information generation unit that generates position correction information indicating a distance between the microphone and the sound source; and a position information generation unit that generates sound source position information indicating a position of the sound source in a target space on the basis of microphone position information indicating a position of the microphone in the target space and the position correction information. The present technology can be applied to a recording/transmission/reproduction system.

11 Claims, 14 Drawing Sheets

FIG. 5

| Syntax | No. of bits | Mneumonic |
|---|---|---|
| Object_metadata() | | |
| { | | |
| For(i=1:object_count){ | | |
| Original_3D_object_index | 3 | uimsbf |
| Object_type_index | 3 | uimsbf |
| Object_position[3] // xyz COORDINATES ($x_o$, $y_o$, $z_o$) IN COORDINATE SYSTEM OF TARGET SPACE | 6x3(xyz) | tcimsbf |
| Object_direction[3] // yaw (AZIMUTH ANGLE) $\psi_o$, pitch (ELEVATION ANGLE) $\theta_o$, roll (LATERAL INCLINATION ANGLE) $\phi_o$ | 6x3(xyz) | tcimsbf |
| } | | |
| } | | |

FIG. 6

| Syntax | No. of bits | Mneumonic |
| --- | --- | --- |
| Object_directivity(type_index) | | |
| { | | |
| Object_directivity[distance][azimuth][elevation] | Distance * azimuth * elevation * 16 | tcimsbf |
| } | | |

SIGNAL PROCESSING DEVICE AND METHOD

CROSS REFERENCE TO RELATED APPLICATIONS

This application is a U.S. National Phase of International Patent Application No. PCT/JP2020/040798 filed on Oct. 30, 2020, which claims priority benefit of Japanese Patent Application No. JP 2019-205113 filed in the Japan Patent Office on Nov. 13, 2019. Each of the above-referenced applications is hereby incorporated herein by reference in its entirety.

TECHNICAL FIELD

The present technology relates to a signal processing device, a method, and a program, and particularly to a signal processing device, a method, and a program that make it possible for a user to obtain a higher realistic feeling.

BACKGROUND ART

Conventionally, there are many object sound source-based audio reproduction methods, but in order to reproduce object sound sources by use of a recorded audio signal recorded at an actual recording site, an audio signal and position information for each object sound source are required. At present, it is common to manually adjust the sound quality of the audio signal after recording, or to manually input or correct the position information for each object sound source.

Furthermore, as a technology related to the object sound source-based audio reproduction, a technology is proposed in which, in a case where a user can freely designate the listening position, gain correction and frequency characteristic correction are performed according to the distance from the changed listening position to an object sound source (for example, see Patent Document 1).

CITATION LIST

Patent Document

Patent Document 1: WO 2015/107926 A

SUMMARY OF THE INVENTION

Problems to be Solved by the Invention

However, there are cases where a sufficiently high realistic feeling cannot be obtained with the above-described technology.

For example, in a case where position information for each object sound source is manually input, it is not always possible to obtain precise position information, and thus it may not be possible for a user to obtain a sufficient realistic feeling even if such position information is used.

The present technology has been made in view of such a situation, and makes it possible for a user to obtain a higher realistic feeling.

Solutions to Problems

A signal processing device according to one aspect of the present technology includes: an audio generation unit that generates a sound source signal according to a type of a sound source on the basis of a recorded signal obtained by sound collection by a microphone attached to a moving object; a correction information generation unit that generates position correction information indicating a distance between the microphone and the sound source; and a position information generation unit that generates sound source position information indicating a position of the sound source in a target space on the basis of microphone position information indicating a position of the microphone in the target space and the position correction information.

A signal processing method or program according to one aspect of the present technology includes steps of: generating a sound source signal according to a type of a sound source on the basis of a recorded signal obtained by sound collection by a microphone attached to a moving object; generating position correction information indicating a distance between the microphone and the sound source; and generating sound source position information indicating a position of the sound source in a target space on the basis of microphone position information indicating a position of the microphone in the target space and the position correction information.

According to one aspect of the present technology, a sound source signal according to a type of a sound source is generated on the basis of a recorded signal obtained by sound collection by a microphone attached to a moving object, position correction information indicating a distance between the microphone and the sound source is generated, and sound source position information indicating a position of the sound source in a target space is generated on the basis of microphone position information indicating a position of the microphone in the target space and the position correction information.

BRIEF DESCRIPTION OF DRAWINGS

FIG. 5 is a diagram illustrating an example of syntax of metadata.

FIG. 6 is a diagram illustrating an example of syntax of directivity data.

MODE FOR CARRYING OUT THE INVENTION

Hereinafter, embodiments to which the present technology is applied will be described with reference to the drawings.

First Embodiment

Configuration Example of Recording/Transmission/Reproduction System

The present technology makes it possible for a user to obtain a higher realistic feeling by attaching recording devices to a plurality of three-dimensional objects in a target space and generating information indicating the positions and directions of actual sound sources, not the positions and directions of the recording devices, on the basis of recorded signals of sounds obtained by the recording devices.

In a recording/transmission/reproduction system to which the present technology is applied, the plurality of three-dimensional objects such as stationary objects or moving objects is regarded as objects, and the recording devices are attached to the objects to record sounds constituting content. Note that the recording devices may be built in the objects.

In particular, in the following, the objects will be described as moving objects. Furthermore, the content generated by the recording/transmission/reproduction system may be content with a free viewpoint or content with a fixed viewpoint.

For example, the following are examples of content suitable for applying the present technology.

- Content that reproduces a field where a team sport is played
- Content that reproduces a performance by an orchestra, marching band, or the like
- Content that reproduces a space where a plurality of performers exists, such as a musical, opera, or play
- Content that reproduces any space at athletic festivals, concert venues, various events, parades in theme parks, or the like Note that, for example, in the content of a performance by a marching band or the like, performers may be stationary or may be moving.

Figure 1:
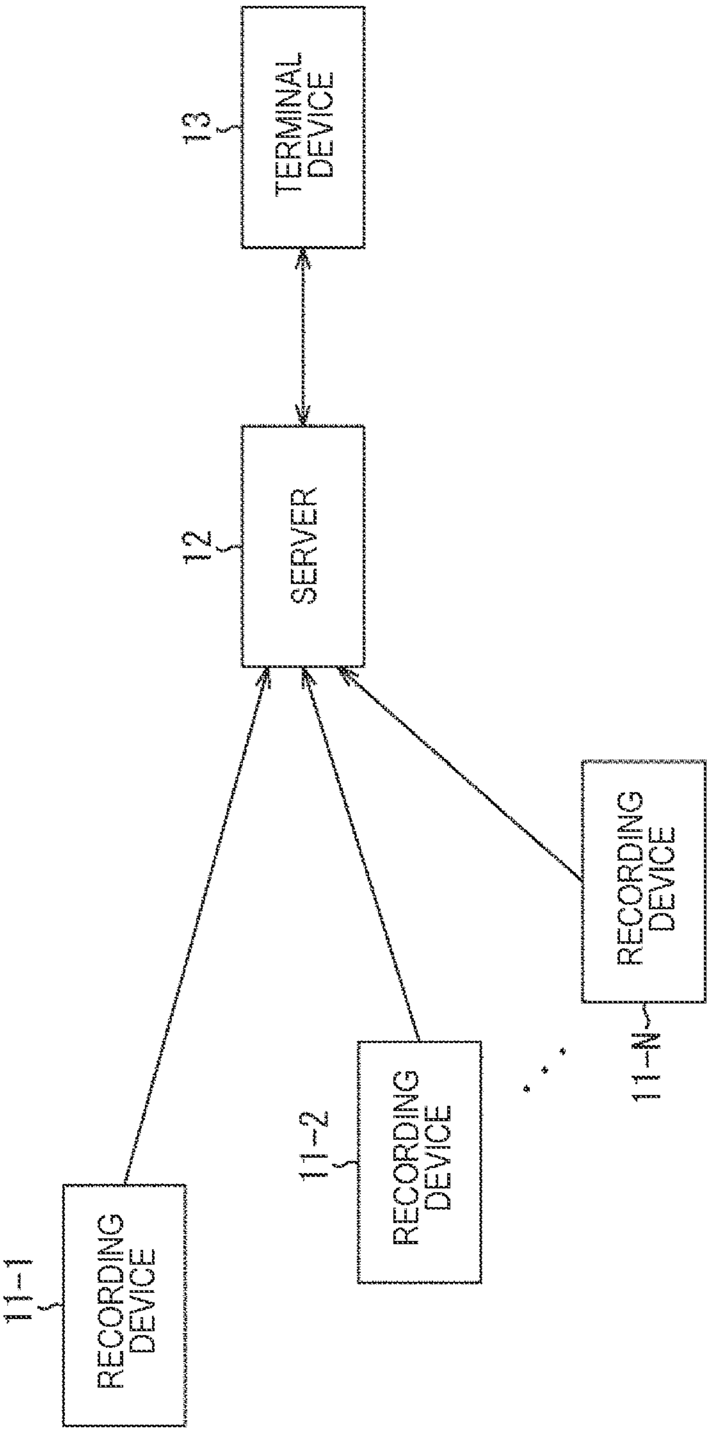
FIG. 1 is a diagram illustrating a configuration example of a recording/transmission/reproduction system.

Furthermore, the recording/transmission/reproduction system to which the present technology is applied is configured as illustrated in FIG. 1, for example.

The recording/transmission/reproduction system illustrated in FIG. 1 includes a recording device 11-1 to a recording device 11-N, a server 12, and a terminal device 13.

The recording device 11-1 to the recording device 11-N are attached to moving objects as a plurality of objects in a space in which content is to be recorded (hereinafter, also referred to as the target space). In the following, in a case where it is not necessary to particularly distinguish between the recording device 11-1 to the recording device 11-N, the recording device 11-1 to the recording device 11-N will be simply referred to as the recording device 11.

The recording device 11 is provided with, for example, a microphone, a distance measuring device, and a motion measuring sensor. Then, the recording device 11 can obtain recorded data including a recorded audio signal obtained by sound collection (recording) by the microphone, a positioning signal obtained by the distance measuring device, and a sensor signal obtained by the motion measuring sensor.

Here, the recorded audio signal obtained by sound collection by the microphone is an audio signal for reproducing a sound around an object.

The sound based on the recorded audio signal includes, for example, a sound whose sound source is the object itself, that is, a sound emitted from the object and a sound emitted by another object around the object.

In the recording/transmission/reproduction system, the sound emitted by the object is regarded as a sound of an object sound source, and content including the sound of the object sound source is provided to the terminal device 13. That is, the sound of the object sound source is extracted as a target sound.

The sound of the object sound source as the target sound is, for example, a voice spoken by a person who is an object, a walking sound or running sound of an object, a motion sound such as a clapping sound or ball kick sound by an object, a musical instrument sound emitted from an instrument played by an object, or the like.

Furthermore, the distance measuring device provided in the recording device 11 includes, for example, a global positioning system (GPS) module, a beacon receiver for indoor ranging, or the like, measures the position of an object to which the recording device 11 is attached, and outputs the positioning signal indicating the measurement result.

The motion measuring sensor provided in the recording device 11 includes, for example, a sensor for measuring the motion and orientation of the object, such as a 9-axis sensor, a geomagnetic sensor, an acceleration sensor, a gyro sensor, an inertial measurement unit (IMU), or a camera (image sensor), and outputs the sensor signal indicating the measurement result.

When the recorded data is obtained by recording, the recording device 11 transmits the recorded data to the server 12 by wireless communication or the like.

Note that one recording device 11 may be attached to one object in the target space, or a plurality of recording devices 11 may be attached to a plurality of different positions of one object.

Furthermore, the position and method of attaching the recording device 11 to each object may be any position and method.

For example, in a case where an object is a person such as an athlete, it is conceivable to attach the recording device 11 to the back of the trunk of the person. When only one recording device 11 is attached to an object in this way, it is necessary to provide two or more microphones in the recording device 11 in order to estimate the arrival direction of a sound of an object sound source as described later.

Furthermore, for example, it is also conceivable to attach the recording device 11 to one of the front of the trunk, the back of the trunk, and the head of a person as an object, or to attach the recording devices 11 to some parts of these parts.

Moreover, although an example in which a moving object as an object is a person such as an athlete will be described here, the object (moving object) may be any object to which the recording device 11 is attached or in which the recording device 11 is built, such as a robot, a vehicle, or a flying object such as a drone.

The server 12 receives the recorded data transmitted from each of the recording devices 11 and generates object sound source data as content data on the basis of the received recorded data.

Here, the object sound source data includes an object sound source signal for reproducing a sound of an object sound source and metadata of the object sound source signal. The metadata includes sound source position information indicating the position of the object sound source, sound source direction information indicating the orientation (direction) of the object sound source, and the like.

In particular, in generating the object sound source data, various types of signal processing based on the recorded data are performed. That is, for example, the distance from the position of the recording device 11 to the position of the object sound source, the relative direction (direction) of the object sound source as seen from the recording device 11, and the like are estimated, and the object sound source data is generated on the basis of the estimation results.

In particular, in the server 12, the object sound source signal, the sound source position information, and the sound source direction information are appropriately generated or corrected by prior information on the basis of the distance and direction obtained by the estimation.

With this configuration, it is possible to obtain a high-quality object sound source signal having a higher signal to noise ratio (SN ratio), and it is possible to obtain more accurate, that is, more precise sound source position information and sound source direction information. As a result, it is possible to implement highly realistic content reproduction.

Note that the prior information used to generate the object sound source data is, for example, specification data regarding each body part of the person as the object to which the recording device 11 is attached, transmission characteristics from the object sound source to the microphones of the recording device 11, and the like.

The server 12 transmits the generated object sound source data to the terminal device 13 via a wired or wireless network or the like.

The terminal device 13 includes an information terminal device such as a smart phone, a tablet, or a personal computer, for example, and receives the object sound source data transmitted from the server 12. Furthermore, the terminal device 13 edits the content on the basis of the received object sound source data, or drives a reproduction device such as headphones (not illustrated) to reproduce the content.

As described above, the recording/transmission/reproduction system makes it possible for a user to obtain a higher realistic feeling by generating the object sound source data including the sound source position information and the sound source direction information indicating the precise position and direction of the object sound source instead of the position and direction of the recording device 11. Furthermore, generating the object sound source signal that is close to the sound at the position of the object sound source, that is, the signal close to the original sound of the object sound source makes it possible for a user to obtain a higher realistic feeling.

For example, in a case where one or more recording devices 11 are attached to the object to record the sound of the object sound source, the sound of the object sound source is collected at the positions of the microphones, which are different from the position of the object sound source. That is, the sound of the object sound source is collected at positions different from the actual generation position. Furthermore, the position where the sound of the object sound source is generated in the object differs depending on the type of the object sound source.

Figure 2:
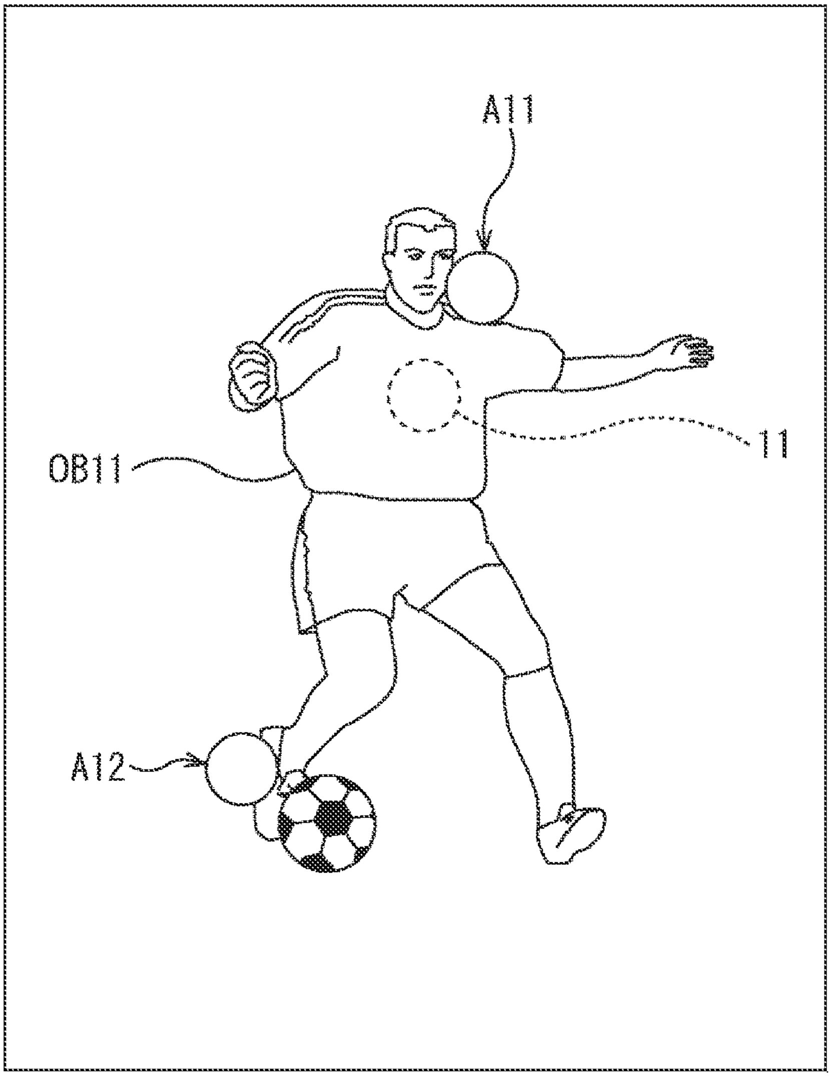
FIG. 2 is a diagram for describing the position of an object sound source and the position of a recording device.

Specifically, for example, as illustrated in FIG. 2, it is assumed that a soccer player is an object OB11, and the recording device 11 is attached to a position on the back of the object OB11 to perform recording.

In this case, for example, when a voice emitted by the object OB11 is the sound of the object sound source, the position of the object sound source is the position indicated by an arrow A11, that is, the position of the mouth of the object OB11, and the position is different from the attaching position of the recording device 11.

Similarly, for example, when a sound emitted by the object OB11 kicking a ball is the sound of the object sound source, the position of the object sound source is the position indicated by an arrow A12, that is, the position of a foot of the object OB11, and the position is different from the attaching position of the recording device 11.

Note that, since the recording device 11 has a small housing to some extent, the positions of the microphones, the distance measuring device, and the motion measuring sensor provided in the recording device 11 can be assumed to be substantially the same.

In a case where the position where the sound of the object sound source is generated and the attaching position of the recording device 11 are different as described above, the sound based on the recorded audio signal greatly changes depending on the positional relationship between the object sound source and the recording device 11 (microphones).

Therefore, in the recording/transmission/reproduction system, the recorded audio signal is corrected by use of the prior information according to the positional relationship between the object sound source and the microphones (recording device 11), so that it is possible to obtain the object sound source signal that is close to the original sound of the object sound source.

Similarly, the position information (positioning signal) and the direction information (sensor signal) obtained at the time of recording by the recording device 11 are information indicating the position and direction of the recording device 11, more specifically, the position and direction of the distance measuring device and the motion measuring sensor. However, the position and direction of the recording device 11 are different from the position and direction of the actual object sound source.

Therefore, the recording/transmission/reproduction system makes it possible to obtain more precise sound source position information and sound source direction information by correcting the position information and direction information obtained at the time of recording according to the positional relationship between the object sound source and the recording device 11.

With the above method, the recording/transmission/reproduction system can reproduce more realistic content.

Configuration Example of Server

Next, a configuration example of the server 12 illustrated in FIG. 1 will be described.

Figure 3:
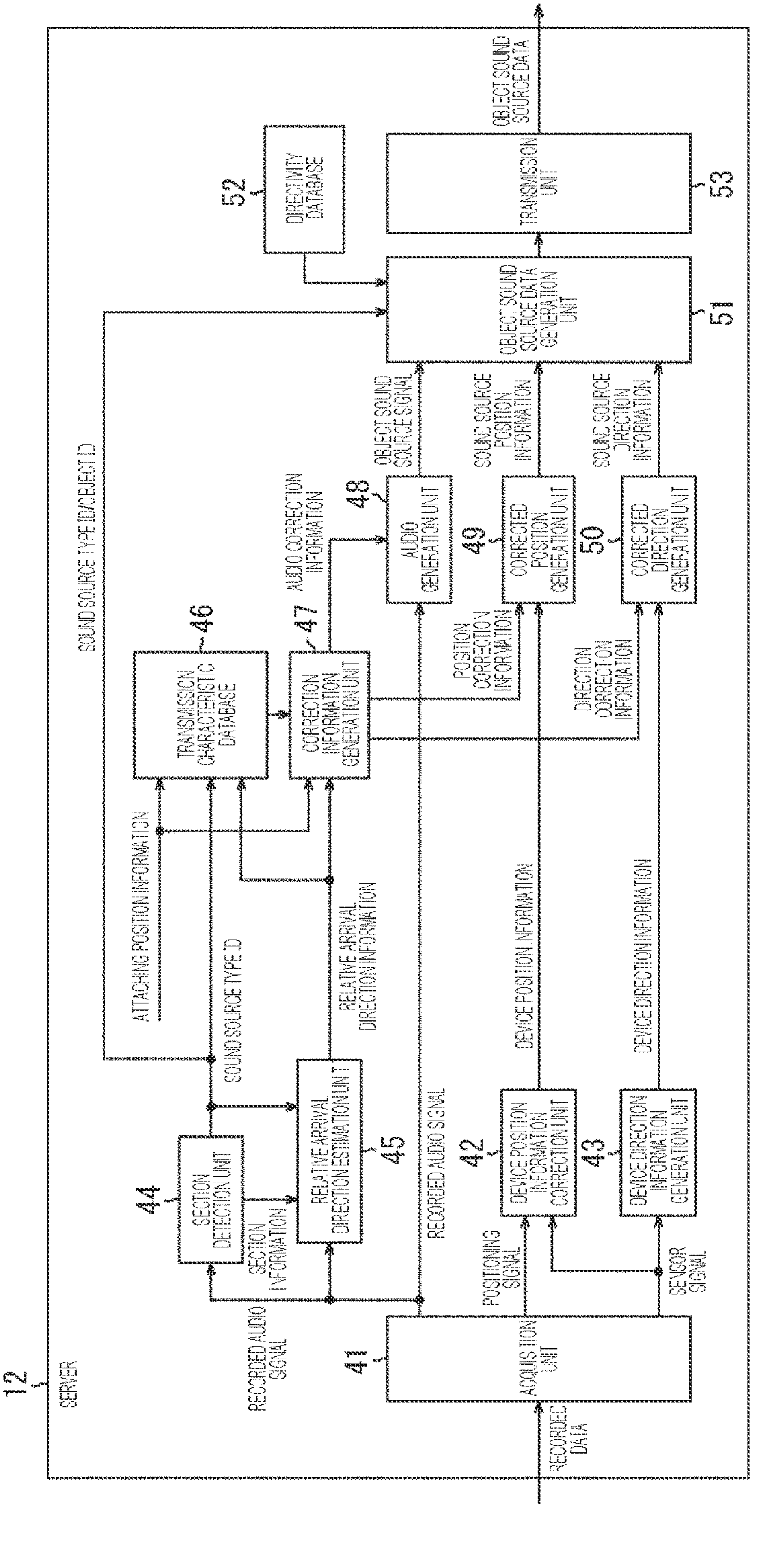
FIG. 3 is a diagram illustrating a configuration example of a server.

The server 12 is configured, for example, as illustrated in FIG. 3.

In the example illustrated in FIG. 3, the server 12 includes an acquisition unit 41, a device position information correction unit 42, a device direction information generation unit 43, a section detection unit 44, a relative arrival direction estimation unit 45, a transmission characteristic database 46, a correction information generation unit 47, an audio generation unit 48, a corrected position generation unit 49, a corrected direction generation unit 50, an object sound source data generation unit 51, a directivity database 52, and a transmission unit 53.

The acquisition unit 41 acquires the recorded data from the recording device 11 by, for example, receiving the recorded data transmitted from the recording device 11.

The acquisition unit 41 supplies the recorded audio signal included in the recorded data to the section detection unit 44, the relative arrival direction estimation unit 45, and the audio generation unit 48.

Furthermore, the acquisition unit 41 supplies the positioning signal and the sensor signal included in the recorded data to the device position information correction unit 42, and supplies the sensor signal included in the recorded data to the device direction information generation unit 43.

The device position information correction unit 42 generates device position information indicating the absolute position of the recording device 11 in the target space by correcting the position indicated by the positioning signal supplied from the acquisition unit 41 on the basis of the sensor signal supplied from the acquisition unit 41, and supplies the device position information to the corrected position generation unit 49.

Here, since the microphones are provided in the recording device 11, it can be said that the device position information correction unit 42 functions as a microphone position information generation unit that generates the device position information indicating the absolute positions of the microphones of the recording device 11 in the target space on the basis of the sensor signal and the positioning signal.

For example, the position indicated by the positioning signal is a position measured by the distance measuring device such as the GPS module, and thus has some error. Therefore, the position indicated by the positioning signal is corrected with the integrated value or the like of the motion of the recording device 11 indicated by the sensor signal, so that it is possible to obtain the device position information indicating a more precise position of the recording device 11.

Here, the device position information is, for example, a latitude and longitude indicating an absolute position on the surface of the earth, coordinates obtained by conversion of the latitude and longitude into a distance, or the like.

In addition, the device position information may be any information indicating the position of the recording device 11, such as coordinates of a coordinate system using, as a reference position, a predetermined position in the target space in which the content is to be recorded.

Furthermore, in a case where the device position information is coordinates (coordinate information), the coordinates may be coordinates of any coordinate system, such as coordinates of a polar coordinate system including an azimuth angle, elevation angle, and radius, coordinates of an xyz coordinate system, that is, coordinates of a three-dimensional Cartesian coordinate system, or coordinates of a two-dimensional Cartesian coordinate system.

Note that, here, since the microphones and the distance measuring device are provided in the recording device 11, it can be said that the position measured by the distance measuring device is the positions of the microphones.

Furthermore, even if the microphones and the distance measuring device are placed apart, the device position information indicating the positions of the microphones can be obtained from the positioning signal obtained by the distance measuring device if the relative positional relationship between the microphones and the distance measuring device is known.

In this case, the device position information correction unit 42 generates the device position information on the basis of information indicating the absolute position of the recording device 11 (distance measuring device), that is, the absolute position of the object in the target space, which is obtained from the positioning signal and the sensor signal, and information indicating the attaching positions of the microphones in the object, that is, information indicating the relative positional relationship between the microphones and the distance measuring device.

The device direction information generation unit 43 generates device direction information indicating the absolute orientation in which the recording device 11 (microphones), that is, the object in the target space is facing, on the basis of the sensor signal supplied from the acquisition unit 41, and supplies the device direction information to the corrected direction generation unit 50. For example, the device direction information is angle information indicating the front direction of the object (recording device 11) in the target space.

Note that the device direction information may include not only the information indicating the orientation of the recording device 11 (object) but also information indicating the rotation (inclination) of the recording device 11.

In the following, it is assumed that the device direction information includes the information indicating the orientation of the recording device 11 and the information indicating the rotation of the recording device 11.

Specifically, for example, the device direction information includes an azimuth angle $\psi$ and elevation angle $\theta$ indicating the orientation of the recording device 11 at the coordinates as the device position information in the coordinate system and an inclination angle $\varphi$ indicating the rotation (inclination) of the recording device 11 at the coordinates as the device position information in the coordinate system.

In other words, it can be said that the device direction information is information indicating Euler angles including the azimuth angle $\psi$ (yaw), the elevation angle $\theta$ (pitch), and the inclination angle $\varphi$ (roll), which indicate the absolute orientation and rotation of the recording device 11 (object).

In the server 12, the sound source position information and the sound source direction information obtained from the device position information and the device direction information are stored in the metadata for each discrete unit time such as for each frame or each predetermined number of frames of the object sound source signal, and transmitted to the terminal device 13.

The section detection unit 44 detects the type (type) of the sound of the object sound source included in the recorded audio signal, that is, the type of the object sound source and a time section in which the sound of the object sound source is included on the basis of the recorded audio signal supplied from the acquisition unit 41.

The section detection unit 44 supplies a sound source type ID as ID information indicating the type of the detected object sound source and section information indicating the time section including the sound of the object sound source to the relative arrival direction estimation unit 45, and supplies the sound source type ID to the transmission characteristic database 46.

Furthermore, the section detection unit 44 supplies an object ID as identification information indicating the object to which the recording device 11 having obtained the recorded audio signal to be detected is attached and the sound source type ID indicating the type of the object sound source detected from the recorded audio signal to the object sound source data generation unit 51.

The object ID and sound source type ID are stored in the metadata of the object sound source signal. With this configuration, on the side of the terminal device 13, it is possible to easily perform an editing operation such as collectively moving sound source position information or the like of a plurality of object sound source signals obtained for the same object.

The relative arrival direction estimation unit 45 generates relative arrival direction information for each time section of the recorded audio signal, which is indicated by the section information, on the basis of the sound source type ID and the section information supplied from the section detection unit 44 and the recorded audio signal supplied from the acquisition unit 41.

Here, the relative arrival direction information is information indicating the relative arrival direction (arrival direction) of the sound of the object sound source as seen from the recording device 11, more specifically, the microphones provided in the recording device 11.

For example, the recording device 11 is provided with a plurality of microphones, and the recorded audio signal is a multi-channel audio signal obtained by sound collection by the plurality of microphones.

The relative arrival direction estimation unit 45 estimates the relative arrival direction of the sound of the object sound source as seen from the microphones, for example, by a multiple signal classification (MUSIC) method that uses the phase difference (correlation) between two or more microphones, and generates the relative arrival direction information indicating the estimation result.

The relative arrival direction estimation unit 45 supplies the generated relative arrival direction information to the transmission characteristic database 46 and the correction information generation unit 47.

The transmission characteristic database 46 holds sound transmission characteristics from the object sound source to the recording device 11 (microphones) for each sound source type (object sound source type).

Here, particularly for each sound source type, for example, the transmission characteristics are held for each combination of the relative direction of the recording device 11 (microphones) as seen from the object sound source and the distance from the object sound source to the recording device 11 (microphones).

In this case, for example, in the transmission characteristic database 46, the sound source type ID, attaching position information, relative direction information, and the transmission characteristics are associated with each other, and the transmission characteristics are held in a table format. Note that the transmission characteristics may be held in association with the relative arrival direction information instead of the relative direction information.

Here, the attaching position information is information indicating the attaching position of the recording device 11 as seen from a reference position of the object, for example, a specific site position of the cervical spine of the person as the object. For example, the attaching position information is coordinate information of a three-dimensional Cartesian coordinate system.

For example, since an approximate position of the object sound source in the object can be specified by the sound source type indicated by the sound source type ID, an approximate distance from the object sound source to the recording device 11 is determined by the sound source type ID and the attaching position information.

Furthermore, the relative direction information is information indicating the relative direction of the recording device 11 (microphones) as seen from the object sound source, and can be obtained from the relative arrival direction information.

Note that an example in which the transmission characteristics are held in a table format will be described below, but the transmission characteristics for each sound source type ID may be held in the form of a function that takes the attaching position information and the relative direction information as arguments.

The transmission characteristic database 46 reads out, from among the transmission characteristics held in advance for each sound source type ID, the transmission characteristics determined by the supplied attaching position information, the sound source type ID supplied from the section detection unit 44, and the relative arrival direction information supplied from the relative arrival direction estimation unit 45, and supplies the read transmission characteristics to the correction information generation unit 47.

That is, the transmission characteristic database 46 supplies the transmission characteristics according to the type of the object sound source indicated by the sound source type ID, the distance from the object sound source to the microphones determined by the attaching position information, and the relative direction between the object sound source and the microphones indicated by the relative direction information to the correction information generation unit 47.

Note that, as the attaching position information supplied to the transmission characteristic database 46, known attaching position information of the recording device 11 may be recorded in the server 12 in advance, or the attaching position information may be included in the recorded data.

The correction information generation unit 47 generates audio correction information, position correction information, and direction correction information on the basis of the supplied attaching position information, the relative arrival direction information supplied from the relative arrival direction estimation unit 45, and the transmission characteristics supplied from the transmission characteristic database 46.

Here, the audio correction information is correction characteristics for obtaining the object sound source signal of the sound of the object sound source on the basis of the recorded audio signal.

Specifically, the audio correction information is reverse characteristics of the transmission characteristics supplied from the transmission characteristic database 46 to the correction information generation unit 47 (hereinafter, also referred to as reverse transmission characteristics).

Note that, although an example in which the transmission characteristics are held in the transmission characteristic database 46 will be described here, the reverse transmission characteristics may be held for each sound source type ID.

Furthermore, the position correction information is offset information of the position of the object sound source as seen from the position of the recording device 11 (microphones). In other words, the position correction information is difference information indicating the relative positional relationship between the recording device 11 and the object sound source, which is indicated by the relative direction and distance between the recording device 11 and the object sound source.

Similarly, the direction correction information is offset information of the direction (direction) of the object sound source as seen from the recording device 11 (microphones), that is, difference information indicating the relative direction between the recording device 11 and the object sound source.

The correction information generation unit 47 supplies the audio correction information, the position correction information, and the direction correction information obtained by calculation to the audio generation unit 48, the corrected position generation unit 49, and the corrected direction generation unit 50.

The audio generation unit 48 generates the object sound source signal on the basis of the recorded audio signal supplied from the acquisition unit 41 and the audio correction information supplied from the correction information generation unit 47, and supplies the object sound source signal to the object sound source data generation unit 51. In other words, the audio generation unit 48 extracts the object sound source signal for each object sound source from the recorded audio signal on the basis of the audio correction information for each sound source type ID.

The object sound source signal obtained by the audio generation unit 48 is an audio signal for reproducing the sound of the object sound source that should be observed at the position of the object sound source.

The corrected position generation unit 49 generates the sound source position information indicating the absolute position of the object sound source in the target space on the basis of the device position information supplied from the device position information correction unit 42 and the position correction information supplied from the correction information generation unit 47, and supplies the sound source position information to the object sound source data generation unit 51. That is, the device position information is corrected on the basis of the position correction information, and as a result, the sound source position information is obtained.

The corrected direction generation unit 50 generates the sound source direction information indicating the absolute orientation (direction) of the object sound source in the target space on the basis of the device direction information supplied from the device direction information generation unit 43 and the direction correction information supplied from the correction information generation unit 47, and supplies the sound source direction information to the object sound source data generation unit 51. That is, the device direction information is corrected on the basis of the direction correction information, and as a result, the sound source direction information is obtained.

The object sound source data generation unit 51 generates the object sound source data from the sound source type ID and the object ID supplied from the section detection unit 44, the object sound source signal supplied from the audio generation unit 48, the sound source position information supplied from the corrected position generation unit 49, and the sound source direction information supplied from the corrected direction generation unit 50, and supplies the object sound source data to the transmission unit 53.

Here, the object sound source data includes the object sound source signal and the metadata of the object sound source signal.

Furthermore, the metadata includes the sound source type ID, the object ID, the sound source position information, and the sound source direction information.

Moreover, the object sound source data generation unit 51 reads out directivity data from the directivity database 52 as necessary and supplies the directivity data to the transmission unit 53.

The directivity database 52 holds, for each type of object sound source indicated by the sound source type ID, the directivity data indicating the directivity of the object sound source, that is, the transmission characteristics in each direction as seen from the object sound source.

The transmission unit 53 transmits the object sound source data and the directivity data supplied from the object sound source data generation unit 51 to the terminal device 13.

<About Each Unit of Server>

Next, each unit included in the server 12 will be described in more detail.

First, the directivity data held in the directivity database 52 will be described.

Figure 4:
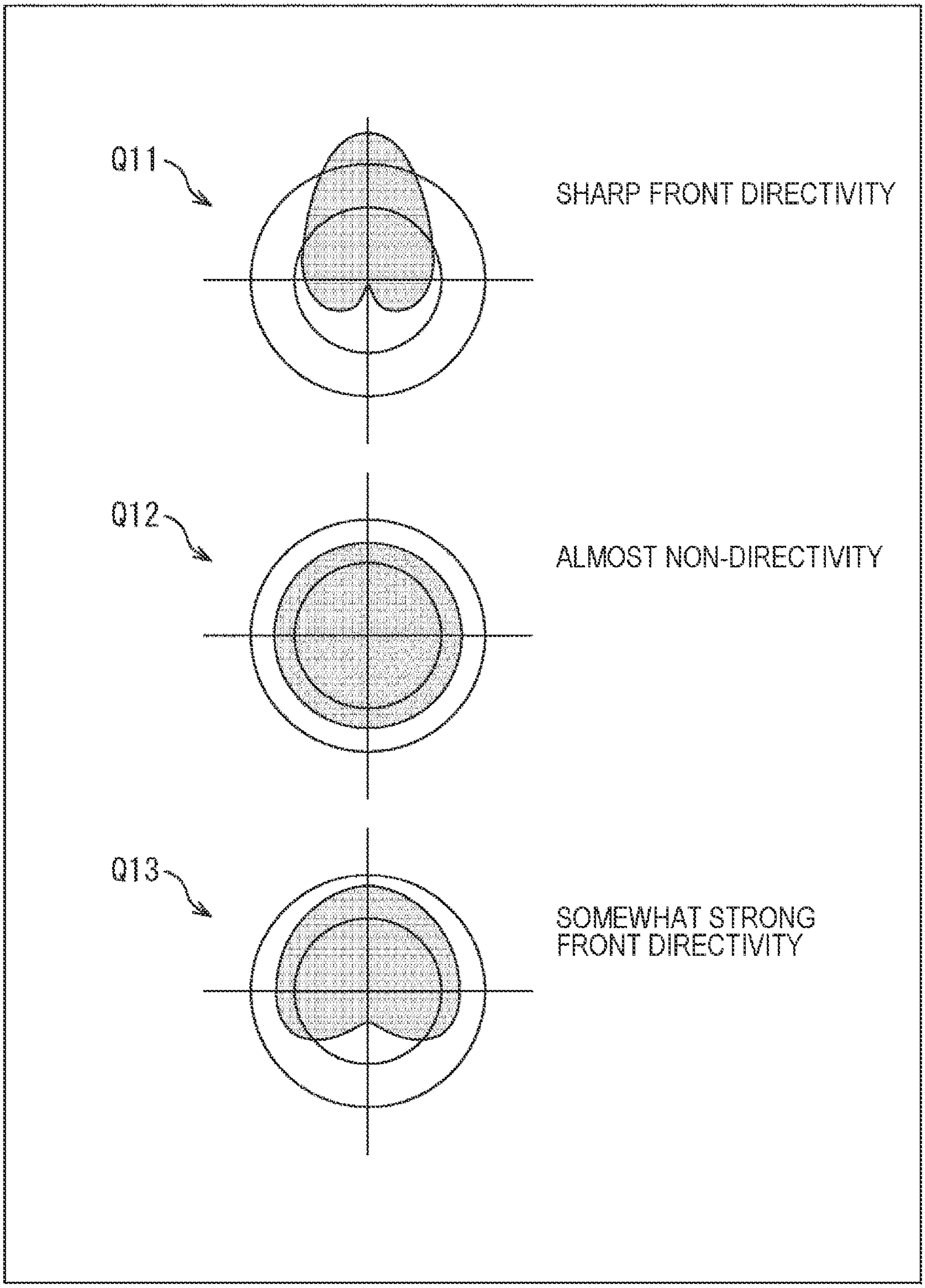
FIG. 4 is a diagram for describing directivity.

For example, as illustrated in FIG. 4, each object sound source has a directivity peculiar to the object sound source.

In the example illustrated in FIG. 4, for example, a whistle as an object sound source has a directivity in which the sound strongly propagates in the front (forward) direction as indicated by an arrow Q11, that is, a sharp front directivity.

Furthermore, for example, a footstep emitted from a spike or the like as an object sound source has a directivity in which the sound propagates in all directions with the same intensity as indicated by an arrow Q12 (non-directivity).

Moreover, for example, a voice emitted from the mouth of a player as an object sound source has a directivity in which the sound strongly propagates to the front and sides as indicated by an arrow Q13, that is, a somewhat strong front directivity.

Such directivity data indicating the directivity of an object sound source can be obtained, for example, by a microphone array acquiring the characteristics (transmission characteristics) of sound propagation to the surroundings for each type of object sound source in an anechoic chamber or the like. In addition, the directivity data can also be obtained, for example, by a simulation being performed on 3D data that simulates the shape of the object sound source.

Specifically, the directivity data is a gain function dir $(i, \psi, \theta)$ or the like defined as a function of an azimuth angle $\psi$ and an elevation angle $\theta$ that each indicate a direction with reference to the front direction of the object sound source as seen from the object sound source, which is defined for a value i of the sound source type ID.

Furthermore, a gain function dir $(i, d, \psi, \theta)$ having a discrete distance d from the object sound source as an argument in addition to the azimuth angle $\psi$ and the elevation angle $\theta$ may be used as the directivity data.

In this case, assigning each argument to the gain function dir $(i, d, \psi, \theta)$ makes it possible to obtain a gain value indicating the sound transmission characteristics as an output of the gain function dir $(i, d, \psi, \theta)$.

This gain value indicates the characteristics (transmission characteristics) of the sound that is emitted from the object sound source of the sound source type whose sound source type ID value is i, propagates in the direction of the azimuth angle $\psi$ and the elevation angle $\theta$ as seen from the object sound source, and reaches the position at the distance d from the object sound source (hereinafter referred to as the position P).

Therefore, if gain correction is performed on the object sound source signal of the sound source type whose sound source type ID value is i on the basis of this gain value, it is possible to reproduce (reproduce) the sound of the object sound source that should actually be heard at the position P.

Note that the directivity data may be, for example, data in an Ambisonics format, that is, data including a spherical harmonic coefficient (spherical harmonic spectrum) in each direction.

Here, a specific example of transmission of the metadata of the object sound source signal and the directivity data will be described.

For example, it is conceivable to prepare the metadata for each frame of a predetermined time length of the object sound source signal, and transmit the metadata and directivity data to the terminal device 13 for each frame by a bitstream syntax illustrated in FIGS. 5 and 6.

Note that, in FIGS. 5 and 6, uimsbf indicates the unsigned integer MSB first and tcimsbf indicates the two's complement integer MSB first.

In the example in FIG. 5, the metadata includes the object ID "Original 3D object index", the sound source type ID "Object type index", the sound source position information "Object position[3]", and the sound source direction information "Object_direction[3]" for each object included in the content.

In particular, in this example, the sound source position information Object position[3] is coordinates ($x_o$, $y_o$, $z_o$) of an xyz coordinate system (three-dimensional Cartesian coordinate system) whose origin is a predetermined reference position in the target space. The coordinates ($x_o$, $y_o$, $z_o$) indicate the absolute position of the object sound source in the xyz coordinate system, that is, the target space.

Furthermore, the sound source direction information Object_direction[3] includes an azimuth angle $\psi_o$ and an elevation angle $\theta_o$ indicating the absolute orientation of the object sound source in the target space and an inclination angle $\varphi_o$.

For example, in content with a free viewpoint, the viewpoint (listening position) changes with time at the time of content reproduction, and thus, for generating reproduction signals, it is advantageous to express the position of the object sound source by coordinates indicating the absolute position instead of relative coordinates with reference to the listening position.

Note that the configuration of the metadata is not limited to the example illustrated in FIG. 5, and may be any other configuration. Furthermore, the metadata is only required to be transmitted at predetermined time intervals, and it is not always necessary to transmit the metadata for each frame.

Furthermore, in the example illustrated in FIG. 6, the gain function "Object directivity[distance][azimuth][elevation]" is transmitted as directivity data corresponding to the value of a predetermined sound source type ID. This gain function includes, as arguments, "distance" as the distance from the sound source and "azimuth" as the azimuth angle and "elevation" as the elevation angle, which indicate the direction as seen from the sound source.

Note that the directivity data may be data in a format in which the intervals of sampling the azimuth angle and the elevation angle as arguments are not equal angular intervals, or data in a higher order Ambisonmics (HOA) format, that is, an Ambisonics format (spherical harmonic coefficient).

For example, for general sound source type directivity data, it is desirable to transmit the directivity data to the terminal device 13 in advance.

On the other hand, for directivity data of an object sound source having uncommon directivity, such as an undefined object sound source, it is also conceivable to include the directivity data in the metadata illustrated in FIG. 5 and transmit the directivity data as the metadata.

Furthermore, the transmission characteristics for each sound source type ID held in the transmission characteristic database 46 can be acquired for each type of object sound source in an anechoic chamber or the like by use of a microphone array, as in the case of directivity data. In addition, the transmission characteristics can also be obtained, for example, by simulation being performed on 3D data that simulates the shape of an object sound source.

The transmission characteristics corresponding to a sound source type ID obtained in this way are held for each relative direction and distance between the object sound source and the recording device 11, unlike the directivity specification data regarding the relative direction and distance as seen from the front direction of the object sound source.

Next, the section detection unit 44 will be described.

For example, the section detection unit 44 holds a discriminator such as a deep neural network (DNN) obtained by learning in advance.

This discriminator takes the recorded audio signal as an input and outputs, as an output value, a probability that a sound of each object sound source to be detected, for example, a human voice, kick sound, clapping sound, footstep, whistle sound, or the like exists, that is, a probability that the sound of the object sound source is included.

The section detection unit 44 assigns the recorded audio signal supplied from the acquisition unit 41 to the held discriminator to perform a calculation, and supplies the output of the discriminator obtained as a result to the relative arrival direction estimation unit 45 as the section information.

Note that, in the section detection unit 44, not only the recorded audio signal but also the sensor signal included in the recorded data may be used as the input of the discriminator, or only the sensor signal may be used as the input of the discriminator.

Since output signals of the acceleration sensor, the gyro sensor, the geomagnetic sensor, and the like as the sensor signals indicate the motion of the object to which the recording device 11 is attached, it is possible to detect the sound of the object sound source according to the motion of the object with high accuracy.

Furthermore, the section detection unit 44 may obtain final section information on the basis of recorded audio signals and section information obtained for a plurality of recording devices 11 different from each other. At this time, device position information, device direction information, and the like obtained for the recording devices 11 may also be used.

For example, the section detection unit 44 sets a predetermined one of the recording devices 11 as a concerned recording device 11, and selects one of the recording devices 11 whose distance from the concerned recording device 11 is equal to or less than a predetermined value as a reference recording device 11 on the basis of the device position information.

Furthermore, for example, when there is an overlap between the time section indicated by the section information of the concerned recording device 11 and the time section indicated by the section information of the reference recording device 11, the section detection unit 44 performs beamforming or the like on the recorded audio signal of the concerned recording device 11 according to the device position information and the device direction information. As a result, a sound from an object to which the reference recording device 11 is attached, which is included in the recorded audio signal of the concerned recording device 11, is suppressed.

The section detection unit 44 obtains the final section information by inputting the recorded audio signal obtained by beamforming or the like to the discriminator and performing the calculation. With this configuration, it is possible to suppress the sound emitted by another object and obtain more accurate section information.

Furthermore, the relative arrival direction estimation unit 45 estimates the relative arrival direction of the sound of the object sound source as seen from the microphones by the MUSIC method or the like, as described above.

At this time, if the sound source type ID supplied from the section detection unit 44 is used, it is possible to narrow down directions (directions) to be targeted at the time of estimating the arrival direction and estimate the arrival direction with higher accuracy.

For example, if the object sound source indicated by the sound source type ID is known, it is possible to specify the direction in which the object sound source may exist with respect to the microphones.

In the MUSIC method, a peak of a relative gain obtained in each direction as seen from the microphones is detected, so that the relative arrival direction of the sound of the object sound source is estimated. At this time, if the type of the object sound source is specified, it is possible to select the correct peak and estimate the arrival direction with higher accuracy.

The correction information generation unit 47 obtains the audio correction information, the position correction information, and the direction correction information by calculation on the basis of the attaching position information, the relative arrival direction information, and the transmission characteristics.

For example, the audio correction information is the reverse transmission characteristics, which are reverse characteristics of the transmission characteristics supplied from the transmission characteristic database 46, as described above.

Furthermore, the position correction information is coordinates ($\Delta x$, $\Delta y$, $\Delta z$) or the like indicating the position of the object sound source as seen from the position of the recording device 11 (microphones).

For example, an approximate position of the object sound source as seen from the attaching position is estimated on the basis of the attaching position of the recording device 11 indicated by the attaching position information and the direction of the object sound source as seen from the attaching position indicated by the relative arrival direction information, and the position correction information can be obtained from the estimation result.

Note that, in estimating the position of the object sound source, the sound source type ID, that is, the type of the object sound source may be used, or the height of the person who is the object, the length of each body part of the person, or constraint parameters of the degree of freedom regarding the movability of the neck and joints of the person may also be used.

For example, if the type of the sound of the object sound source specified by the sound source type ID is a spoken voice, it is possible to specify an approximate positional relationship between the mouth of the person as the object and the attaching position indicated by the attaching position information.

The direction correction information is angle information ($\Delta\psi$, $\Delta\theta$, $\Delta\varphi$ or the like indicating Euler angles including an azimuth angle $\Delta\psi$, an elevation angle $\Delta\theta$, and an inclination angle $\Delta\varphi$ indicating the direction (direction) and rotation of the object sound source as seen from the position of the recording device 11 (microphones).

Such direction correction information can be obtained from the attaching position information and the relative arrival direction information. Since the relative arrival direction information is obtained from the multi-channel recorded audio signal obtained by the plurality of microphones, it can also be said that the correction information generation unit 47 generates the direction correction information on the basis of the recorded audio signal and the attaching position information.

Furthermore, even in the calculation of the direction correction information, the height of the person who is the object, the length of each body part of the person, and the constraint parameters of the degree of freedom regarding the movability of the neck and joints of the person may be used.

The audio generation unit 48 generates the object sound source signal by convolving the recorded audio signal from the acquisition unit 41 and the audio correction information from the correction information generation unit 47.

The recorded audio signal observed by the microphones is a signal obtained by addition of the transmission characteristics between the object sound source and the microphones to the signal of the sound emitted from the object sound source. Therefore, when the audio correction information, which is the reverse characteristics of the transmission characteristics, is added to the recorded audio signal, the original sound of the object sound source that should be observed at the object sound source position is restored.

Figure 7:
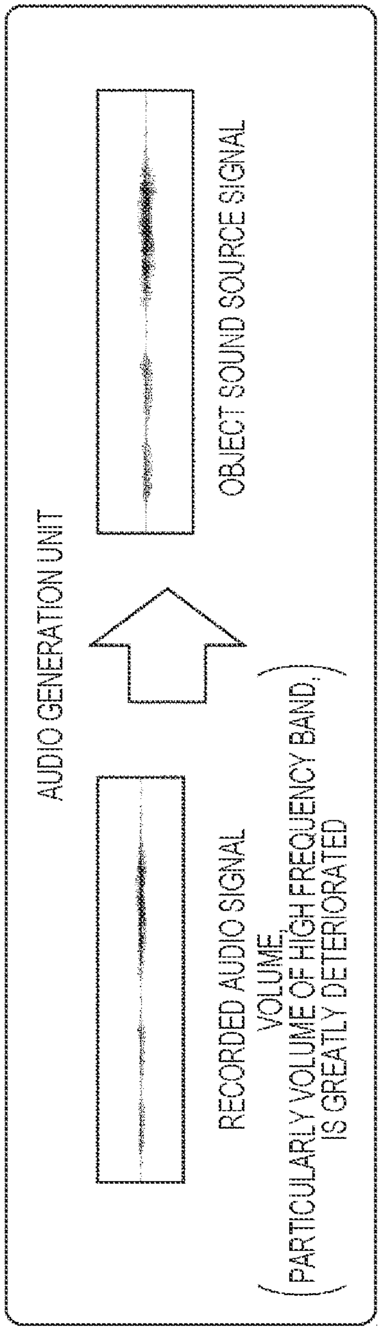
FIG. 7 is a diagram for describing generation of an object sound source signal.

In a case where the recording device 11 is attached to the back of the person as the object and a recording is made, for example, the recorded audio signal illustrated on the left side of FIG. 7 can be obtained.

In this example, in the recorded audio signal, the volume of the sound of the object sound source, particularly the volume of the high frequency band, is greatly deteriorated.

Convolving the audio correction information with such a recorded audio signal makes it possible to obtain the object sound source signal illustrated on the right side of FIG. 7. In this example, the volume of the object sound source signal is generally louder than that of the recorded audio signal, and it can be seen that a signal closer to the original sound is obtained.

Note that the audio generation unit 48 may also use the section information obtained by the section detection unit 44 to generate the object sound source signal.

For example, the time section indicated by the section information is cut out from the recorded audio signal for each sound source type indicated by a sound source type ID, or mute processing is performed on the recorded audio signal in sections other than the time section indicated by the section information, so that the audio signal of only the sound of the object sound source can be extracted from the recorded audio signal.

Convolving the audio signal of only the sound of the object sound source obtained in this way and the audio correction information makes it possible to obtain a high-quality object sound source signal having a higher SN ratio.

Furthermore, the corrected position generation unit 49 generates the sound source position information by the position correction information being added (added) to the device position information indicating the position of the recording device 11. In other words, the position indicated by the device position information is corrected by the position correction information to be the position of the object sound source.

Similarly, the corrected direction generation unit 50 generates the sound source direction information by the direction correction information being added (added) to the device direction information indicating the direction of the recording device 11. In other words, the direction (direction) indicated by the device direction information is corrected by the direction correction information to be the direction of the object sound source.

<Description of Object Sound Source Data Generation Processing>

Next, the operation of the server 12 will be described.

When the recorded data is transmitted from the recording device 11, the server 12 performs object sound source data generation processing and transmits the object sound source data to the terminal device 13.

Hereinafter, the object sound source data generation processing by the server 12 will be described with reference to a flowchart of FIG. 8.

In step S11, the acquisition unit 41 acquires the recorded data from the recording device 11.

The acquisition unit 41 supplies the recorded audio signal included in the recorded data to the section detection unit 44, the relative arrival direction estimation unit 45, and the audio generation unit 48.

Furthermore, the acquisition unit 41 supplies the positioning signal and the sensor signal included in the recorded data to the device position information correction unit 42, and supplies the sensor signal included in the recorded data to the device direction information generation unit 43.

In step S12, the device position information correction unit 42 generates the device position information on the basis of the sensor signal and the positioning signal supplied from the acquisition unit 41, and supplies the device position information to the corrected position generation unit 49.

In step S13, the device direction information generation unit 43 generates the device direction information on the basis of the sensor signal supplied from the acquisition unit 41 and supplies the device direction information to the corrected direction generation unit 50.

In step S14, the section detection unit 44 detects the time section including the sound of the object sound source on the basis of the recorded audio signal supplied from the acquisition unit 41, and supplies the section information indicating the detection result to the relative arrival direction estimation unit 45.

For example, the section detection unit 44 generates the section information indicating the detection result of the time section by assigning the recorded audio signal to the discriminator held in advance and performing the calculation.

Furthermore, the section detection unit 44 supplies the sound source type ID to the relative arrival direction estimation unit 45 and the transmission characteristic database 46 according to the detection result of the time section including the sound of the object sound source, and supplies the object ID and the sound source type ID to the object sound source data generation unit 51.

In step S15, the relative arrival direction estimation unit 45 generates the relative arrival direction information on the basis of the sound source type ID and section information supplied from the section detection unit 44 and the recorded audio signal supplied from the acquisition unit 41, and supplies the relative arrival direction information to the transmission characteristic database 46 and the correction information generation unit 47. For example, in step S15, the relative arrival direction of the sound of the object sound source is estimated by the MUSIC method or the like, and the relative arrival direction information is generated.

Furthermore, when the sound source type ID and the relative arrival direction information are supplied from the section detection unit 44 and the relative arrival direction estimation unit 45, the transmission characteristic database 46 acquires the attaching position information held by the server 12, reads out the transmission characteristics, and supplies the transmission characteristics to the correction information generation unit 47.

That is, the transmission characteristic database 46 reads out, from among the held transmission characteristics, the transmission characteristics determined by the supplied sound source type ID, relative arrival direction information, and attaching position information, and supplies the transmission characteristics to the correction information generation unit 47. At this time, the relative direction information is generated from the relative arrival direction information as appropriate, and the transmission characteristics are read out.

In step S16, the correction information generation unit 47 generates the audio correction information by calculating the reverse characteristics of the transmission characteristics supplied from the transmission characteristic database 46, and supplies the audio correction information to the audio generation unit 48.

In step S17, the correction information generation unit 47 generates the position correction information on the basis of the supplied attaching position information and the relative arrival direction information supplied from the relative arrival direction estimation unit 45, and supplies the position correction information to the corrected position generation unit 49.

In step S18, the correction information generation unit 47 generates the direction correction information on the basis of the supplied attaching position information and the relative arrival direction information supplied from the relative arrival direction estimation unit 45, and supplies the direction correction information to the corrected direction generation unit 50.

In step S19, the audio generation unit 48 generates the object sound source signal by convoluting the recorded audio signal supplied from the acquisition unit 41 and the audio correction information supplied from the correction information generation unit 47, and supplies the object sound source signal to the object sound source data generation unit 51.

In step S20, the corrected position generation unit 49 generates the sound source position information by adding the position correction information supplied from the correction information generation unit 47 to the device position information supplied from the device position information correction unit 42, and supplies the sound source position information to the object sound source data generation unit 51.

In step S21, the corrected direction generation unit 50 generates the sound source direction information by adding the direction correction information supplied from the correction information generation unit 47 to the device direction information supplied from the device direction information generation unit 43, and supplies the sound source direction information to the object sound source data generation unit 51.

In step S22, the object sound source data generation unit 51 generates the object sound source data and supplies the object sound source data to the transmission unit 53.

That is, the object sound source data generation unit 51 generates the metadata including the sound source type ID and the object ID supplied from the section detection unit 44, the sound source position information supplied from the corrected position generation unit 49, and the sound source direction information supplied from the corrected direction generation unit 50.

Furthermore, the object sound source data generation unit 51 generates the object sound source data including the object sound source signal supplied from the audio generation unit 48 and the generated metadata.

In step S23, the transmission unit 53 transmits (transmits) the object sound source data supplied from the object sound source data generation unit 51 to the terminal device 13, and the object sound source data generation processing ends. Note that the timing of transmitting the object sound source data to the terminal device 13 can be any timing after the object sound source data is generated.

As described above, the server 12 acquires the recorded data from the recording device 11 and generates the object sound source data.

At this time, the position correction information and the direction correction information are generated for each object sound source on the basis of the recorded audio signal, and the sound source position information and the sound source direction information are generated by use of the position correction information and the direction correction information, so that it is possible to obtain information indicating a more precise position and direction of the object sound source. As a result, on the side of the terminal device 13, rendering can be performed by use of more precise sound source position information and sound source direction information, and more realistic content reproduction can be implemented.

Furthermore, appropriate transmission characteristics are selected on the basis of the information obtained from the recorded audio signal, and the object sound source signal is generated on the basis of the audio correction information obtained from the selected transmission characteristics, so that it is possible to obtain the signal of the sound of the object sound source, which is closer to the original sound. As a result, a higher realistic feeling can be obtained on the side of the terminal device 13.

Configuration Example of Terminal Device

Figure 9:
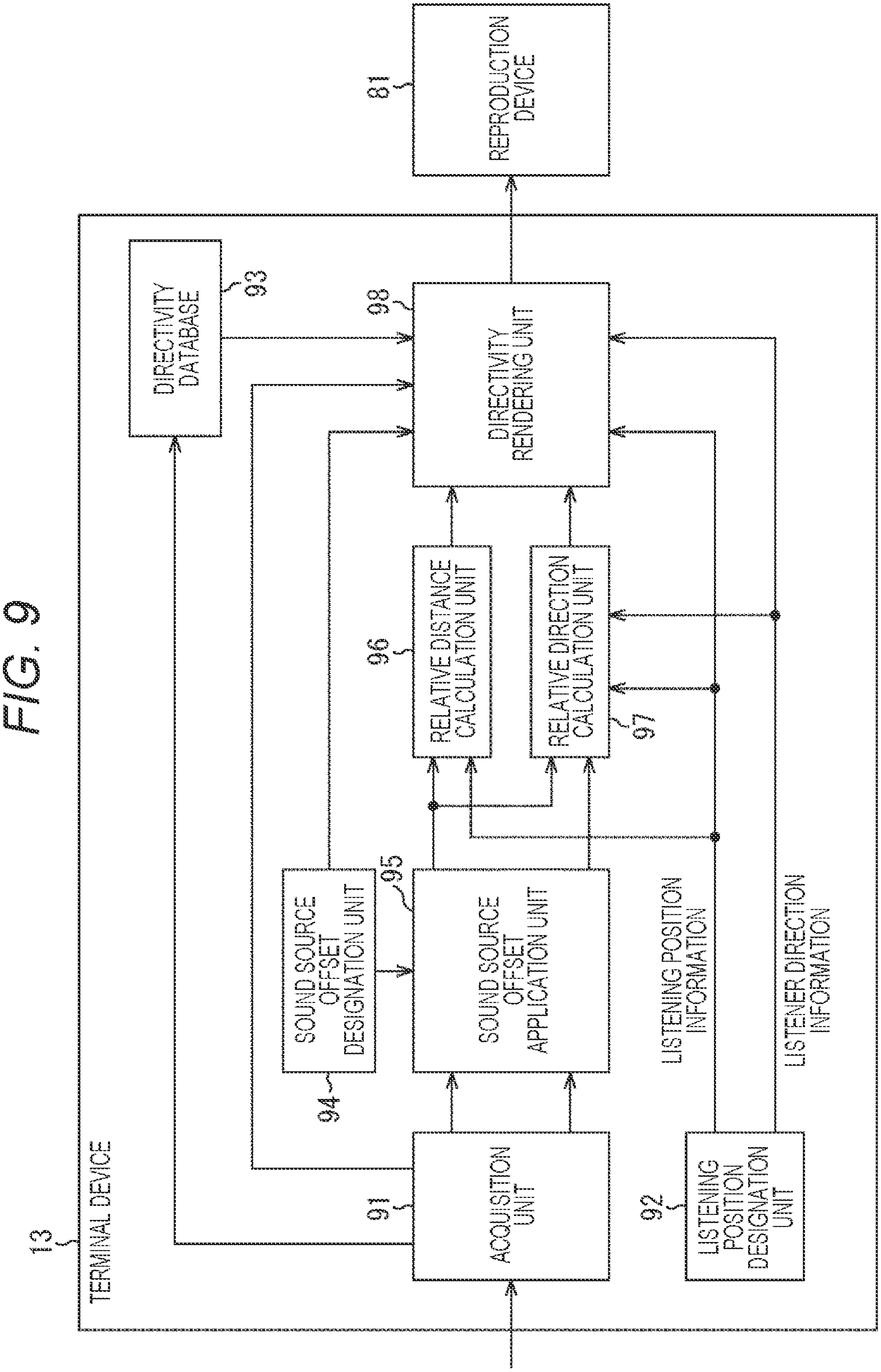
FIG. 9 is a diagram illustrating a configuration example of a terminal device.

Furthermore, the terminal device 13 illustrated in FIG. 1 is configured as illustrated in FIG. 9, for example.

In the example illustrated in FIG. 9, a reproduction device 81 including, for example, headphones, earphones, a speaker array, and the like is connected to the terminal device 13.

The terminal device 13 generates the reproduction signals that reproduce the sound of the content (object sound source) at the listening position on the basis of the directivity data acquired in advance from the server 12 or the like or shared in advance and the object sound source data received from the server 12.

For example, the terminal device 13 generates the reproduction signals by performing vector based amplitude panning (VBAP), processing for wave front synthesis, convolution processing of a head related transfer function (HRTF), or the like by use of the directivity data.

The terminal device 13 then supplies the generated reproduction signals to the reproduction device 81 to reproduce the sound of the content.

The terminal device 13 includes an acquisition unit 91, a listening position designation unit 92, a directivity database 93, a sound source offset designation unit 94, a sound source offset application unit 95, a relative distance calculation unit 96, a relative direction calculation unit 97, and a directivity rendering unit 98.

The acquisition unit 91 acquires the object sound source data and the directivity data from the server 12, for example, by receiving data transmitted from the server 12.

Note that the timing of acquiring the directivity data and the timing of acquiring the object sound source data may be the same or different.

The acquisition unit 91 supplies the acquired directivity data to the directivity database 93 and causes the directivity database 93 to record the directivity data.

Furthermore, when the object sound source data is acquired, the acquisition unit 91 extracts the object ID, the sound source type ID, the sound source position information, the sound source direction information, and the object sound source signal from the object sound source data.

The acquisition unit 91 then supplies the sound source type ID to the directivity database 93, supplies the object ID, the sound source type ID, and the object sound source signal to the directivity rendering unit 98, and supplies the sound source position information and the sound source direction information to the sound source offset application unit 95.

The listening position designation unit 92 designates the listening position in the target space and the orientation of a listener (user) at the listening position according to a user operation or the like, and outputs listening position information indicating the listening position and listener direction information indicating the orientation of the listener as designation results.

That is, the listening position designation unit 92 supplies the listening position information to the relative distance calculation unit 96, the relative direction calculation unit 97, and the directivity rendering unit 98, and supplies the listener direction information to the relative direction calculation unit 97 and the directivity rendering unit 98.

The directivity database 93 records the directivity data supplied from the acquisition unit 91. In the directivity database 93, for example, the same directivity data as that recorded in the directivity database 52 of the server 12 is recorded.

Furthermore, when the sound source type ID is supplied from the acquisition unit 91, the directivity database 93 supplies, from among the plurality of pieces of recorded directivity data, the piece of directivity data of the sound source type indicated by the supplied sound source type ID to the directivity rendering unit 98.

In a case where an instruction is made to adjust sound quality for a specific object or object sound source by a user operation or the like, the sound source offset designation unit 94 supplies sound quality adjustment target information including the object ID or the sound source type ID indicating a sound quality adjustment target to the directivity rendering unit 98. At this time, a gain value or the like for sound quality adjustment may be included in the sound quality adjustment target information.

Furthermore, for example, in the sound source offset designation unit 94, an instruction may be made to move or rotate the position of a specific object or object sound source in the target space by a user operation or the like.

In such a case, the sound source offset designation unit 94 supplies movement/rotation target information including the object ID or sound source type ID indicating the target of movement or rotation and position offset information indicating the indicated movement amount or direction offset information indicating the indicated rotation amount to the sound source offset application unit 95.

Here, the position offset information is, for example, coordinates ($\Delta x_o$, $\Delta y_o$, $\Delta z_o$) indicating an offset amount (movement amount) of the sound source position information. Furthermore, the direction offset information is, for example, angle information ($\Delta\psi_o$, $\Delta\theta_o$, $\Delta\varphi_o$) indicating an offset amount (rotation amount) of the sound source direction information.

By outputting such sound quality adjustment target information or movement/rotation target information, the terminal device 13 can edit the content, such as adjusting the sound quality of the sound of the object sound source, moving a sound image of the object sound source, or rotating the sound image of the object sound source.

In particular, in a unit of an object, that is, for all the object sound sources of the object, the terminal device 13 can collectively adjust the sound quality, the sound image position, the rotation of the sound image, and the like of all the object sound sources.

Furthermore, the terminal device 13 can adjust the sound quality, the sound image position, the rotation of the sound image, and the like in a unit of an object sound source, that is, for only one object sound source.

The sound source offset application unit 95 generates corrected sound source position information and corrected sound source direction information by applying the offset based on the movement/rotation target information supplied from the sound source offset designation unit 94 to the sound source position information and the sound source direction information supplied from the acquisition unit 91.

For example, it is assumed that the movement/rotation target information includes the object ID, the position offset information, and the direction offset information.

In such a case, for all the object sound sources of the object indicated by the object ID, the sound source offset application unit 95 adds the position offset information to the sound source position information to obtain the corrected sound source position information, and adds the direction offset information to the sound source direction information to obtain the corrected sound source direction information.

The corrected sound source position information and the corrected sound source direction information obtained in this way are information indicating the final position and orientation of the object sound source, whose position and orientation have been corrected.

Similarly, for example, it is assumed that the movement/rotation target information includes the sound source type ID, the position offset information, and the direction offset information.

In such a case, for the object sound source indicated by the sound source type ID, the sound source offset application unit 95 adds the position offset information to the sound source position information to obtain the corrected sound source position information, and adds the direction offset information to the sound source direction information to obtain the corrected sound source direction information.

Note that, in a case where the movement/rotation target information does not include the corrected sound source position information, that is, in a case where an instruction is not made to move the position of the object sound source, the sound source position information is used as the corrected sound source position information as it is.

Similarly, in a case where the movement/rotation target information does not include the corrected sound source direction information, that is, in a case where an instruction is not made to rotate the object sound source, the sound source direction information is used as the corrected sound source direction information as it is.

The sound source offset application unit 95 supplies the corrected sound source position information obtained in this way to the relative distance calculation unit 96 and the relative direction calculation unit 97, and supplies the corrected sound source direction information to the relative direction calculation unit 97.

The relative distance calculation unit 96 calculates the relative distance between the listening position (listener) and the object sound source on the basis of the corrected sound source position information supplied from the sound source offset application unit 95 and the listening position information supplied from the listening position designation unit 92, and supplies sound source relative distance information indicating the calculation result to the directivity rendering unit 98.

The relative direction calculation unit 97 calculates the relative direction between the listener and the object sound source on the basis of the corrected sound source position information and the corrected sound source direction information supplied from the sound source offset application unit 95 and the listening position information and the listener direction information supplied from the listening position designation unit 92, and supplies sound source relative direction information indicating the calculation result to the directivity rendering unit 98.

Here, the sound source relative direction information includes a sound source azimuth angle, a sound source elevation angle, a sound source rotation azimuth angle, and a sound source rotation elevation angle.

The sound source azimuth angle and the sound source elevation angle are respectively an azimuth angle and an elevation angle that indicate the relative direction of the object sound source as seen from the listener.

Furthermore, the sound source rotation azimuth angle and the sound source rotation elevation angle are respectively an azimuth angle and an elevation angle that indicate the relative direction of the listener (listening position) as seen from the object sound source. In other words, it can be said that the sound source rotation azimuth angle and the sound source rotation elevation angle are information indicating how much the front direction of the object sound source is rotated with respect to the listener.

The sound source rotation azimuth angle and the sound source rotation elevation angle are an azimuth angle and an elevation angle in referring to the directivity data during the rendering processing.

The directivity rendering unit 98 performs the rendering processing on the basis of the object ID, the sound source type ID, and the object sound source signal supplied from the acquisition unit 91, the directivity data supplied from the directivity database 93, the sound source relative distance information supplied from the relative distance calculation unit 96, the sound source relative direction information supplied from the relative direction calculation unit 97, and the listening position information and the listener direction information supplied from the listening position designation unit 92.

For example, the directivity rendering unit 98 performs VBAP, processing for wave front synthesis, convolution processing of HRTF, or the like as the rendering processing. Note that the listening position information and the listener direction information are only required to be used in the rendering processing as needed, and do not necessarily have to be used in the rendering processing.

Furthermore, for example, in a case where the sound quality adjustment target information is supplied from the sound source offset designation unit 94, the directivity rendering unit 98 adjusts the sound quality for the object sound source signal specified by the object ID or the sound source type ID included in the sound quality adjustment target information.

The directivity rendering unit 98 supplies the reproduction signals obtained by the rendering processing to the reproduction device 81 to reproduce the sound of the content.

Here, the generation of the reproduction signals by the directivity rendering unit 98 will be described. In particular, an example in which VBAP is performed as the rendering processing will be described here.

For example, in a case where the sound quality adjustment target information is supplied from the sound source offset designation unit 94, the directivity rendering unit 98 performs, as sound quality adjustment, processing such as gain adjustment for the object sound source signal specified by the object ID or the sound source type ID included in the sound quality adjustment target information.

As a result, for example, it is possible to collectively adjust the sound quality of the sounds of all the object sound sources of the object indicated by the object ID, or to mute a sound of a specific object sound source such as a voice or walking sound of the person as the object.

Next, the directivity rendering unit 98 calculates a distance attenuation gain value, which is a gain value for reproducing distance attenuation, on the basis of the relative distance indicated by the sound source relative distance information.

In addition, the directivity rendering unit 98 assigns the sound source rotation azimuth angle and the sound source rotation elevation angle included in the sound source relative direction information to the directivity data such as a gain function supplied from the directivity database 93 to perform a calculation, and calculates a directivity gain value, which is a gain value according to the directivity of the object sound source.

Moreover, the directivity rendering unit 98 determines reproduction gain values for channels corresponding to speakers of the speaker array constituting the reproduction device 81 by VBAP on the basis of the sound source azimuth angle and the sound source elevation angle included in the sound source relative direction information.

The directivity rendering unit 98 then performs the gain adjustment by multiplying the object sound source signal whose sound quality has been adjusted as appropriate by the distance attenuation gain value, the directivity gain value, and the reproduction gain values, to generate the reproduction signals for the channels corresponding to the speakers.

As described above, the terminal device 13 performs the rendering processing on the basis of the sound source position information and the sound source direction information indicating the position and orientation of the object sound source and the object sound source signal closer to the original sound, so that it is possible to implement more realistic content reproduction.

Note that the reproduction signals generated by the directivity rendering unit 98 may be recorded on a recording medium or the like without being output to the reproduction device 81.

<Description of Reproduction Processing>

Figure 10:
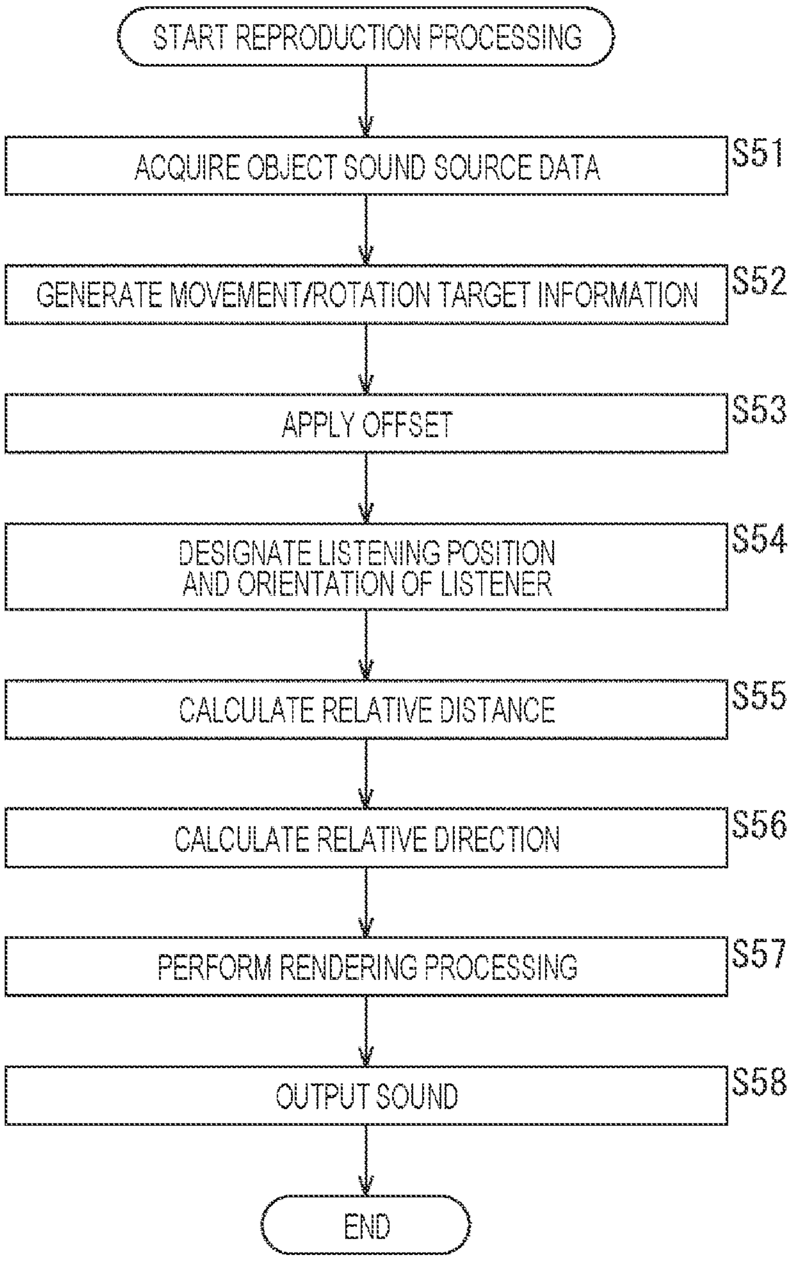
FIG. 10 is a flowchart for describing reproduction processing.

Next, the operation of the terminal device 13 will be described. That is, the reproduction processing performed by the terminal device 13 will be described below with reference to a flowchart of FIG. 10.

In step S51, the acquisition unit 91 acquires the object sound source data from the server 12.

Furthermore, the acquisition unit 91 extracts the object ID, the sound source type ID, the sound source position information, the sound source direction information, and the object sound source signal from the object sound source data.

The acquisition unit 91 then supplies the sound source type ID to the directivity database 93, supplies the object ID, the sound source type ID, and the object sound source signal to the directivity rendering unit 998, and supplies the sound source position information and the sound source direction information to the sound source offset application unit 95.

Furthermore, the directivity database 93 reads out the directivity data determined by the sound source type ID supplied from the acquisition unit 91 and supplies the directivity data to the directivity rendering unit 98.

In step S52, the sound source offset designation unit 94 generates the movement/rotation target information indicating the movement amount or rotation amount of the object or the object sound source according to a user operation or the like, and supplies the movement/rotation target information to the sound source offset application unit 95.

Furthermore, in a case where an instruction is made to adjust the sound quality, the sound source offset designation unit 94 also generates the sound quality adjustment target information according to a user operation or the like and supplies the sound quality adjustment target information to the directivity rendering unit 98.

In step S53, the sound source offset application unit 95 generates the corrected sound source position information and the corrected sound source direction information by applying the offset based on the movement/rotation target information supplied from the sound source offset designation unit 94 to the sound source position information and the sound source direction information supplied from the acquisition unit 91.

The sound source offset application unit 95 supplies the corrected sound source position information obtained by applying the offset to the relative distance calculation unit 96 and the relative direction calculation unit 97, and supplies the corrected sound source direction information to the relative direction calculation unit 97.

In step S54, the listening position designation unit 92 designates the listening position in the target space and the orientation of the listener at the listening position according to a user operation or the like, and generates the listening position information and the listener direction information.

The listening position designation unit 92 supplies the listening position information to the relative distance calculation unit 96, the relative direction calculation unit 97, and the directivity rendering unit 98, and supplies the listener direction information to the relative direction calculation unit 97 and the directivity rendering unit 98.

In step S55, the relative distance calculation unit 96 calculates the relative distance between the listening position and the object sound source on the basis of the corrected sound source position information supplied from the sound source offset application unit 95 and the listening position information supplied from the listening position designation unit 92, and supplies the sound source relative distance information indicating the calculation result to the directivity rendering unit 98.

In step S56, the relative direction calculation unit 97 calculates the relative direction between the listener and the object sound source on the basis of the corrected sound source position information and the corrected sound source direction information supplied from the sound source offset application unit 95 and the listening position information and the listener direction information supplied from the listening position designation unit 92, and supplies the sound source relative direction information indicating the calculation result to the directivity rendering unit 98.

In step S57, the directivity rendering unit 98 performs the rendering processing to generate the reproduction signals.

That is, in a case where the sound quality adjustment target information is supplied from the sound source offset designation unit 94, the directivity rendering unit 98 adjusts the sound quality for the object sound source signal specified by the object ID or the sound source type ID included in the sound quality adjustment target information.

The directivity rendering unit 98 then performs the rendering processing such as VBAP on the basis of the object sound source signal whose sound quality has been adjusted as appropriate, the directivity data supplied from the directivity database 93, the sound source relative distance information supplied from the relative distance calculation unit 96, the sound source relative direction information supplied from the relative direction calculation unit 97, and the listening position information and the listener direction information supplied from the listening position designation unit 92.

In step S58, the directivity rendering unit 98 supplies the reproduction signals obtained in the processing of step S57 to the reproduction device 81, and causes the reproduction device 81 to output the sound based on the reproduction signals. As a result, the sound of the content, that is, the sound of the object sound source is reproduced.

When the sound of the content is reproduced, the reproduction processing ends.

As described above, the terminal device 13 acquires the object sound source data from the server 12, and performs the rendering processing on the basis of the object sound source signal, the sound source position information, the sound source direction information, and the like included in the object sound source data.

The series of processing makes it possible to implement more realistic content reproduction by use of the sound source position information and the sound source direction information indicating the position and orientation of the object sound source and the object sound source signal closer to the original sound.

Second Embodiment

Configuration Example of Server

Incidentally, it is also possible to attach a plurality of recording devices 11 to an object.

For example, when the object is a person and the plurality of recording devices 11 is attached to the person, various attaching positions such as the trunk and legs, the trunk and head, or the trunk and arms can be considered.

Figure 11:
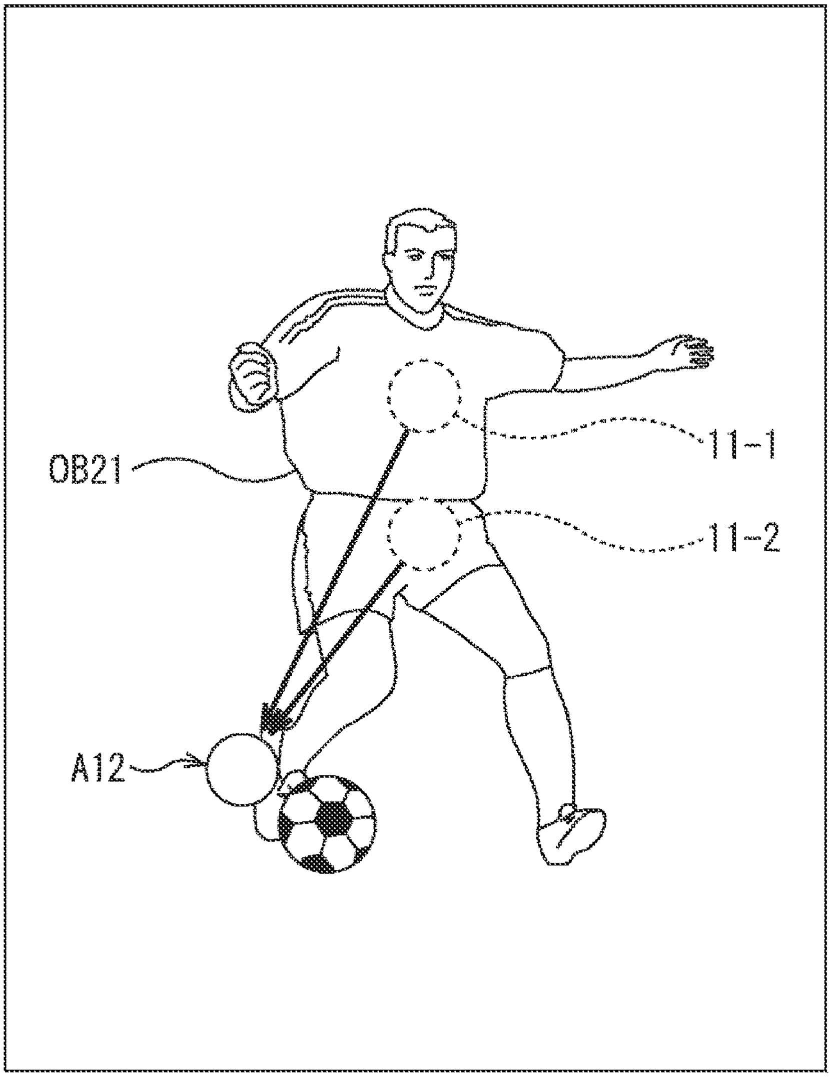
FIG. 11 is a diagram for describing attachment of a plurality of recording devices.

Here, for example, as illustrated in FIG. 11, it is assumed that an object OB21 is a soccer player, and a recording device 11-1 and a recording device 11-2 are attached to the back and waist of the soccer player, respectively.

In such a case, for example, when the position indicated by an arrow A21 is the position of an object sound source and a sound is emitted, it is possible to obtain recorded data in which the sound of the same object sound source is recorded by both the recording device 11-1 and the recording device 11-2.

In particular, in this example, since the attaching positions of the recording device 11-1 and the recording device 11-2 are different, the direction of the object sound source as seen from the recording device 11-1 is different from the direction of the object sound source as seen from the recording device 11-2.

Thus, more information can be obtained for one object sound source. Therefore, integrating the pieces of information regarding the same object sound source obtained by the recording devices 11 makes it possible to obtain more accurate information.

Figure 12:
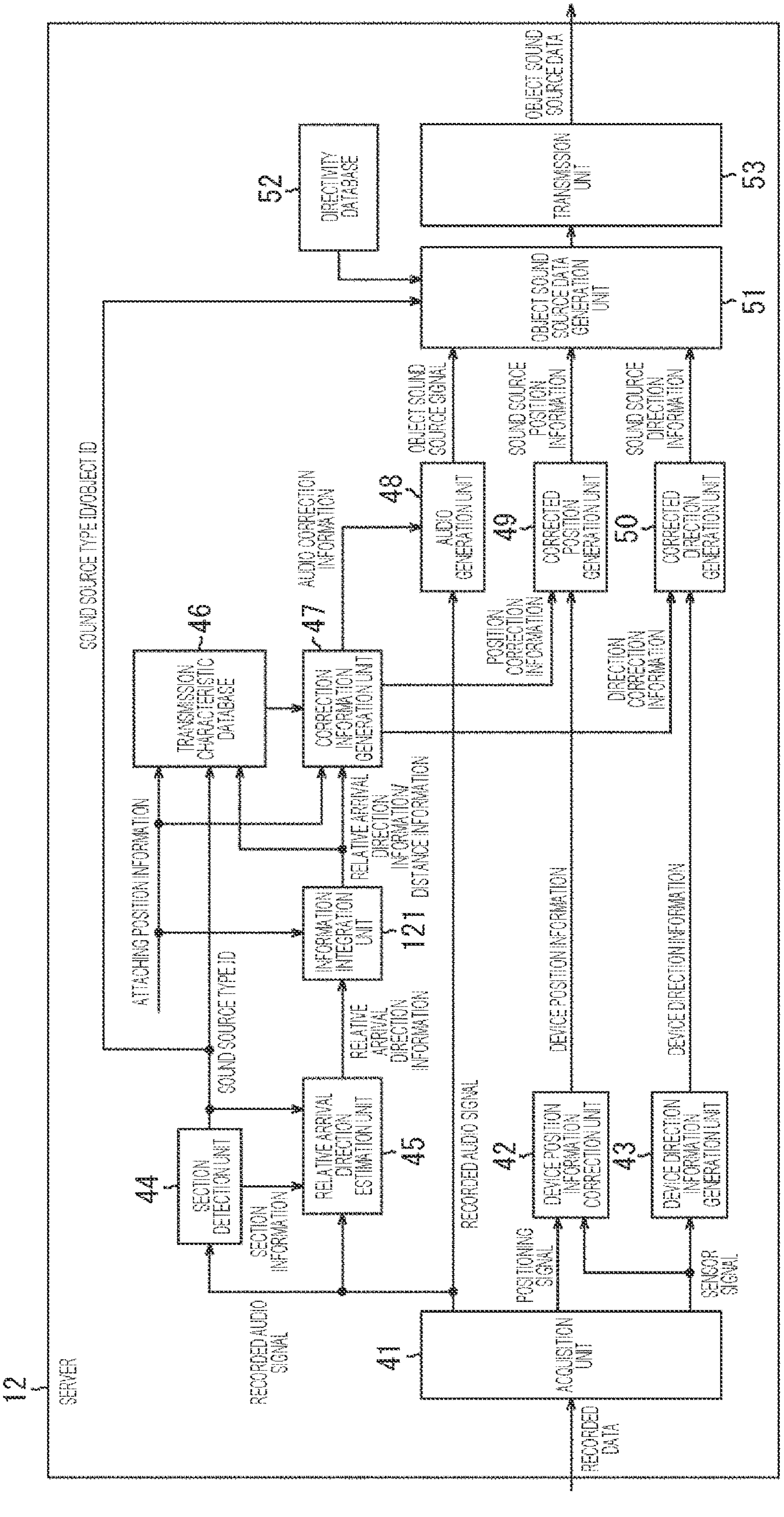
FIG. 12 is a diagram illustrating a configuration example of a server.

As described above, in the case of integrating different pieces of information obtained for the same object sound source, the server 12 is configured as illustrated in FIG. 12, for example. Note that, in FIG. 12, parts corresponding to the parts in the case of FIG. 3 are designated by the same reference signs, and the description thereof will be omitted as appropriate.

The server 12 illustrated in FIG. 12 includes an acquisition unit 41, a device position information correction unit 42, a device direction information generation unit 43, a section detection unit 44, a relative arrival direction estimation unit 45, an information integration unit 121, a transmission characteristic database 46, a correction information generation unit 47, an audio generation unit 48, a corrected position generation unit 49, a corrected direction generation unit 50, an object sound source data generation unit 51, a directivity database 52, and a transmission unit 53.

The configuration of the server 12 illustrated in FIG. 12 is different from the configuration of the server 12 illustrated in FIG. 3 in that the information integration unit 121 is newly provided, and is the same as the configuration of the server 12 in FIG. 3 in other respects.

The information integration unit 121 performs integration processing for integrating relative arrival direction information obtained for the same object sound source (sound source type ID) on the basis of supplied attaching position information and the relative arrival direction information supplied from the relative arrival direction estimation unit 45. By such integration processing, one piece of final relative arrival direction information is generated for one object sound source.

Furthermore, the information integration unit 121 also generates distance information indicating the distance from the object sound source to each of the recording devices 11, that is, the distance between the object sound source and each microphone, on the basis of the result of the integration processing.

The information integration unit 121 supplies the final relative arrival direction information and the distance information obtained in this way to the transmission characteristic database 46 and the correction information generation unit 47.

Here, the integration processing will be described.

For example, it is assumed that the relative arrival direction estimation unit 45 obtains, for one object sound source, relative arrival direction information RD1 obtained from a recorded audio signal for one recording device 11-1 and relative arrival direction information RD2 obtained from a recorded audio signal for the other recording device 11-2. Note that it is assumed that the recording device 11-1 and the recording device 11-2 are attached to the same object.

In this case, the information integration unit 121 estimates the position of the object sound source using the principle of triangulation on the basis of attaching position information and the relative arrival direction information RD1 for the recording device 11-1 and attaching position information and the relative arrival direction information RD2 for the recording device 11-2.

The information integration unit 121 then selects either the recording device 11-1 or the recording device 11-2.

For example, the information integration unit 121 selects, from the recording device 11-1 and the recording device 11-2, the recording device 11 capable of collecting the sound of the object sound source with a higher SN ratio, such as the recording device 11 closer to the position of the object sound source. Here, for example, it is assumed that the recording device 11-1 is selected.

The information integration unit 121 then generates, as the final relative arrival direction information, information indicating the arrival direction of the sound from the position of the object sound source as seen from the recording device 11-1 (microphone) on the basis of the attaching position information for the recording device 11-1 and the obtained position of the object sound source. Furthermore, the information integration unit 121 also generates the distance information indicating the distance from the recording device 11-1 (microphone) to the position of the object sound source.

Note that, more specifically, in this case, information that the recording device 11-1 is selected is supplied from the information integration unit 121 to the audio generation unit 48, the corrected position generation unit 49, and the corrected direction generation unit 50. The recorded audio signal, device position information, and device direction information obtained for the recording device 11-1 are then used to generate an object sound source signal, sound source position information, and sound source direction information. As a result, it is possible to obtain a high-quality object sound source signal having a higher SN ratio, and more precise sound source position information and sound source direction information.

In addition, the final relative arrival direction information and the distance information may be generated for both the recording device 11-1 and the recording device 11-2.

Furthermore, in the transmission characteristic database 46, the relative arrival direction information and the distance information supplied from the information integration unit 121 are used to select transmission characteristics. For example, in a case where the transmission characteristics are held in the form of a function, the relative arrival direction information and the distance information can be used as arguments assigned to the function.

Moreover, the relative arrival direction information and the distance information obtained in the information integration unit 121 are also used in the correction information generation unit 47 to generate position correction information and direction correction information.

In the integration processing as described above, using the plurality of pieces of relative arrival direction information obtained for the same object sound source of the same object makes it possible to obtain more accurate information as the final relative arrival direction information. In other words, it is possible to improve the robustness in calculating the relative arrival direction information.

Note that, at the time of integration processing by the information integration unit 121, transmission characteristics held in the transmission characteristic database 46 may be used.

For example, it is possible to estimate an approximate distance between each of the recording devices 11 and the object sound source on the basis of the degree of sound attenuation according to the distance from the object sound source, which can be seen from the transmission characteristics, and the recorded audio signal. Therefore, as described above, using the estimation result of the distance between each of the recording devices 11 and the object sound source makes it possible to further improve the estimation accuracy of the distance and the relative direction (direction) between the object sound source and each of the recording devices 11.

Furthermore, here, an example in which the plurality of recording devices 11 is attached to the object has been described, but one microphone array may be provided in the recording device 11, and another microphone array may be connected to the recording device 11 by wire or wirelessly.

Even in such a case, since the microphone arrays are provided at a plurality of different positions of one object and the positions of the microphone arrays connected to the recording device 11 are known, the recorded data can be obtained for each of these microphone arrays. The above-described integration processing can also be performed on the recorded data obtained in this way.

<Description of Object Sound Source Data Generation Processing>

Next, the operation of the server 12 illustrated in FIG. 12 will be described.

Figure 13:
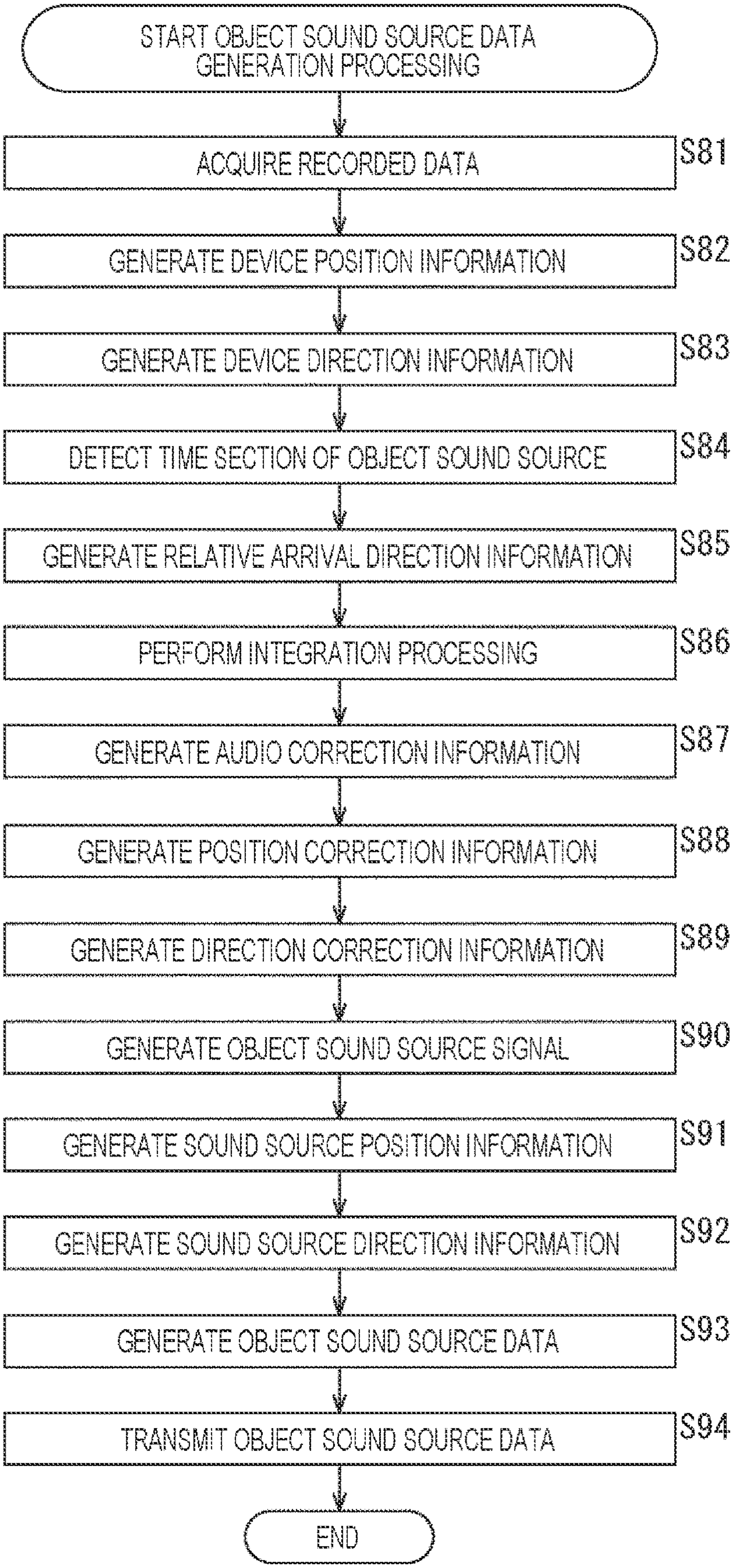
FIG. 13 is a flowchart for describing object sound source data generation processing.

That is, object sound source data generation processing performed by the server 12 illustrated in FIG. 12 will be described below with reference to a flowchart of FIG. 13.

Figure 8:
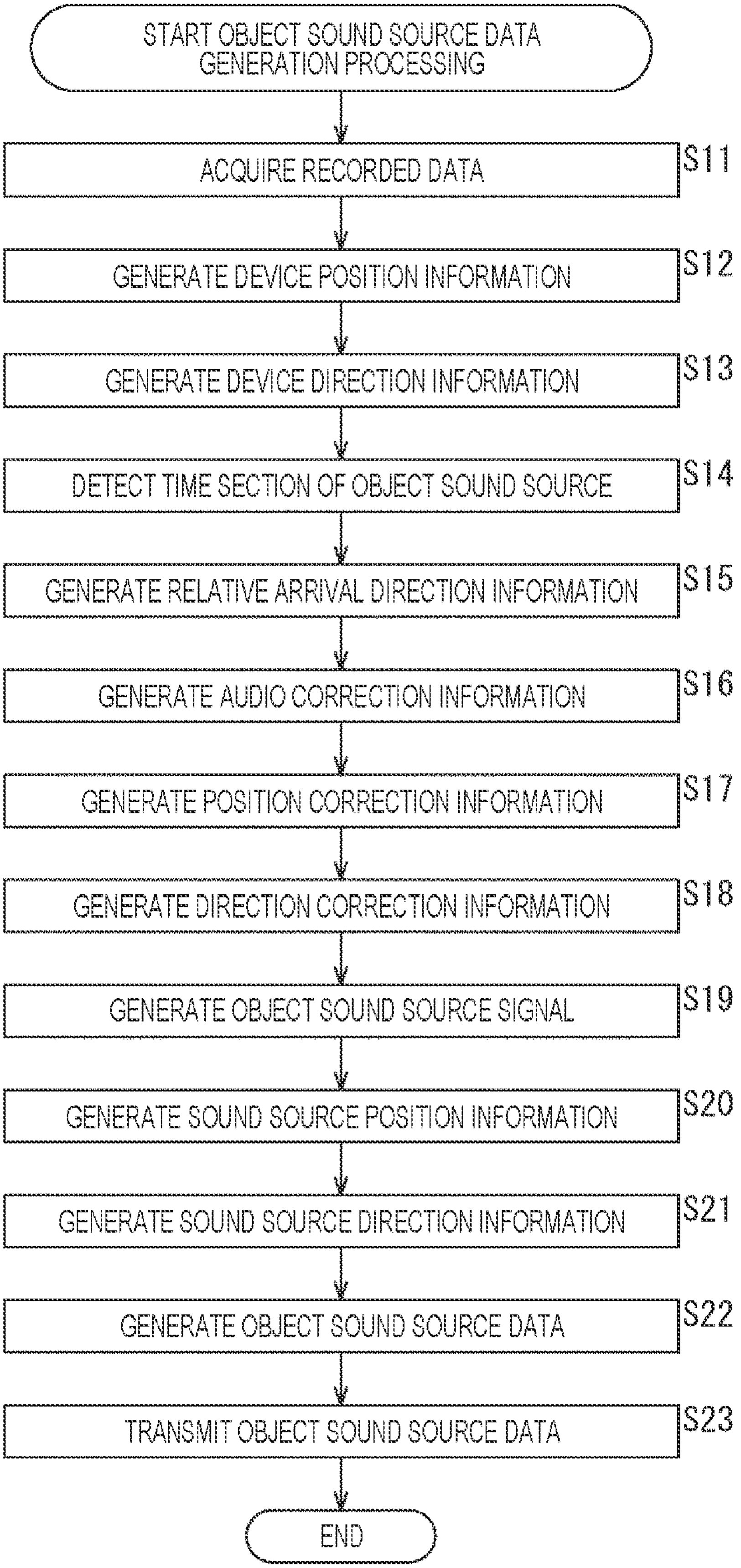
FIG. 8 is a flowchart for describing object sound source data generation processing.

Note that, since processing of steps S81 to S85 is similar to the processing of steps S11 to S15 in FIG. 8, the description thereof will be omitted as appropriate.

However, in step S85, the relative arrival direction estimation unit 45 supplies the obtained relative arrival direction information to the information integration unit 121.

In step S86, the information integration unit 121 performs integration processing on the basis of the supplied attaching position information and the relative arrival direction information supplied from the relative arrival direction estimation unit 45. Furthermore, the information integration unit 121 generates the distance information indicating the distance from the object sound source to each of the recording devices 11 on the basis of the result of the integration processing.

The information integration unit 121 supplies the relative arrival direction information obtained by the integration processing and the distance information to the transmission characteristic database 46 and the correction information generation unit 47.

When the integration processing is performed, processing of steps S87 and S94 is then performed and the object sound source data generation processing ends, but the series of processing is similar to the processing of steps S16 to S23 in FIG. 8, and thus the description will be omitted.

However, in step S88 and step S89, not only the relative arrival direction information and the attaching position information but also the distance information is used to generate the position correction information and the direction correction information.

As described above, the server 12 acquires the recorded data from the recording device 11 and generates the object sound source data.

As a result, on the side of the terminal device 13, it is possible to implement more realistic content reproduction. In particular, performing the integration processing makes it possible to obtain more reliable relative arrival direction information, and as a result, it is possible for a user to obtain a higher realistic feeling.

As described above, according to the present technology, it is possible for a user to obtain a higher realistic feeling at the time of content reproduction.

For example, in free-viewpoint sound field reproduction such as bird view or walk-through, it is important to minimize reverberation, noise, and mixing of sounds from other sound sources and to record a target sound such as a human voice, a player motion sound such as a ball kick sound in a sport, or a musical instrument sound in music, with as high an SN ratio as possible. Furthermore, at the same time, it is necessary to reproduce the sound with a precise localization for each sound source of the target sound, and for the sound image localization or the like to follow the movement of the viewpoint or the sound source.

However, in collecting sound in the real world, it is impossible to collect the sound at the position of the object sound source because there are restrictions on a place where a microphone can be placed, and thus a recorded audio signal is affected by the transmission characteristics between the object sound source and the microphone.

On the other hand, in the present technology, in a case where the recording device 11 is attached to an object such as a moving object and a recording is made to generate recorded data, it is possible to obtain sound source position information and sound source direction information indicating the position and orientation of the actual object sound source from the recorded data and prior information such as the transmission characteristics. Furthermore, in the present technology, it is possible to obtain an object sound source signal that is close to the sound (original sound) of the actual object sound source.

As descried above, it is possible to obtain the object sound source signal corresponding to the absolute sound pressure (frequency characteristics) at the position where the object sound source actually exists and metadata including the sound source position information and the sound source direction information accompanying the object sound source signal, and thus, in the present technology, it is possible to restore the original sound of the object sound source even if a recording is made in an attaching position that is not ideal.

Furthermore, in the present technology, on the reproduction side of content with a free viewpoint or a fixed viewpoint, reproduction or editing can be performed in consideration of the directivity of the object sound source.

Configuration Example of Computer

Incidentally, the series of processing described above can be executed by hardware or software. In a case where the series of processing is executed by software, programs included in the software are installed in a computer. Here, the computer includes a computer embedded in dedicated hardware, a general-purpose personal computer, for example, capable of executing various functions by installing various programs, and the like.

Figure 14:
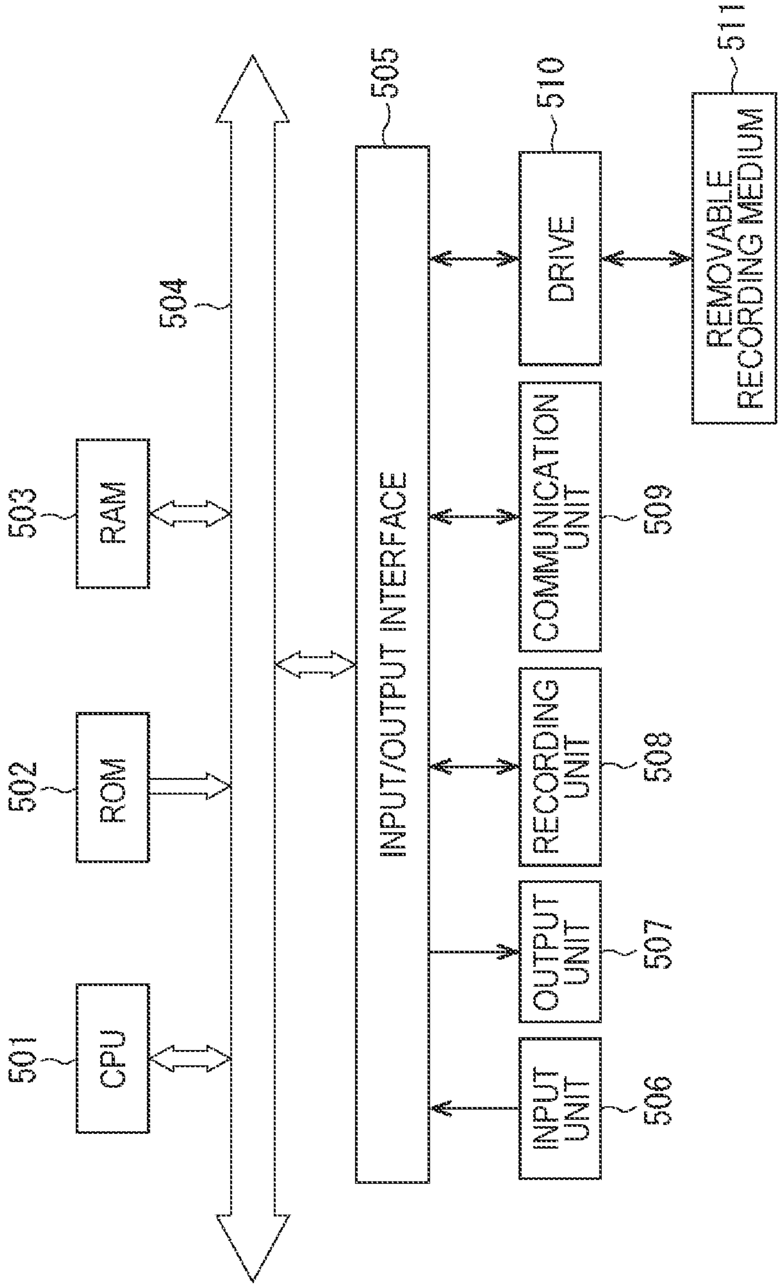
FIG. 14 is a diagram illustrating a configuration example of a computer.

FIG. 14 is a block diagram illustrating a configuration example of hardware of the computer that executes the series of processing described above by the programs.

In the computer, a central processing unit (CPU) 501, a read only memory (ROM) 502, and a random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, for example, the CPU 501 loads a program recorded in the recording unit 508 into the RAM 503 via the input/output interface 505 and the bus 504 and executes the program to perform the series of processing described above.

The program executed by the computer (CPU 501) can be provided by being recorded on the removable recording medium 511 as a package medium or the like, for example. The program can also be provided via a wired or wireless transmission medium such as a local area network, the Internet, or digital satellite broadcasting.

In the computer, the program can be installed in the recording unit 508 via the input/output interface 505 by the removable recording medium 511 being mounted on the drive 510. Furthermore, the program can be received by the communication unit 509 via the wired or wireless transmission medium and installed in the recording unit 508. In addition, the program can be installed in advance in the ROM 502 or the recording unit 508.

Note that the program executed by the computer may be a program in which the processing is performed in time series in the order described in the present specification, or may be a program in which the processing is performed in parallel or at a necessary timing such as when a call is made.

Furthermore, embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or shared and executed by a plurality of devices.

Moreover, in a case where one step includes a plurality of sets of processing, the plurality of sets of processing included in the one step can be executed by one device or shared and executed by a plurality of devices.

Furthermore, the present technology can also have the following configurations.

(1)

A Signal Processing Device Including:

an audio generation unit that generates a sound source signal according to a type of a sound source on the basis of a recorded signal obtained by sound collection by a microphone attached to a moving object;

a correction information generation unit that generates position correction information indicating a distance between the microphone and the sound source; and a position information generation unit that generates sound source position information indicating a position of the sound source in a target space on the basis of microphone position information indicating a position of the microphone in the target space and the position correction information.

(2)

The signal processing device according to (1), further including an object sound source data generation unit that generates object sound source data including the sound source signal and metadata including the sound source position information and sound source type information indicating the type of the sound source.

(3)

The signal processing device according to (1) or (2), further including a microphone position information generation unit that generates the microphone position information on the basis of information indicating a position of the moving object in the target space and information indicating a position of the microphone in the moving object.

(4)

The signal processing device according to (2), in which the correction information generation unit generates direction correction information indicating a relative direction between a plurality of the microphones and the sound source on the basis of the recorded signal obtained by the microphones, the signal processing device further includes a direction information generation unit that generates sound source direction information indicating a direction of the sound source in the target space on the basis of microphone direction information indicating a direction of each of the microphones in the target space and the direction correction information, and the object sound source data generation unit generates the object sound source data including the sound source signal and the metadata including the sound source type information, the sound source position information, and the sound source direction information.

(5)

The signal processing device according to (4), in which the object sound source data generation unit generates the object sound source data including the sound source signal and the metadata including the sound source type information, identification information indicating the moving object, the sound source position information, and the sound source direction information.

(6)

The signal processing device according to any one of (1) to (5), in which the correction information generation unit further generates audio correction information for generating the sound source signal on the basis of transmission characteristics from the sound source to the microphone, and the audio generation unit generates the sound source signal on the basis of the audio correction information and the recorded signal.

(7)

The signal processing device according to (6), in which the correction information generation unit generates the audio correction information on the basis of the transmission characteristics according to the type of the sound source.

(8)

The signal processing device according to (6) or (7), in which the correction information generation unit generates the audio correction information on the basis of the transmission characteristics according to a relative direction between the microphone and the sound source.

(9)

The signal processing device according to any one of (6) to (8), in which the correction information generation unit generates the audio correction information on the basis of the transmission characteristics according to the distance between the microphone and the sound source.

(10)

A signal processing method performed by a signal processing device, the signal processing method including:

generating a sound source signal according to a type of a sound source on the basis of a recorded signal obtained by sound collection by a microphone attached to a moving object;

generating position correction information indicating a distance between the microphone and the sound source; and generating sound source position information indicating a position of the sound source in a target space on the basis of microphone position information indicating a position of the microphone in the target space and the position correction information.

(11)

A program for causing a computer to execute processing including steps of:

generating a sound source signal according to a type of a sound source on the basis of a recorded signal obtained by sound collection by a microphone attached to a moving object;

generating position correction information indicating a distance between the microphone and the sound source; and generating sound source position information indicating a position of the sound source in a target space on the basis of microphone position information indicating a position of the microphone in the target space and the position correction information.

REFERENCE SIGNS LIST

11-1 to 11-N, 11 Recording device
12 Server
13 Terminal device
41 Acquisition unit
44 Section detection unit
45 Relative arrival direction estimation unit
46 Transmission characteristic database
47 Correction information generation unit
48 Audio generation unit
49 Corrected position generation unit
50 Corrected direction generation unit
51 Object sound source data generation unit
53 Transmission unit

The invention claimed is:

1. A signal processing device, comprising:

an audio generation unit configured to:

generate a sound source signal based on a recorded signal obtained by sound collection by a microphone attached to a moving object, wherein the sound source signal is generated based on a type of a sound source;

a correction information generation unit configured to:

generate position correction information that indicates a distance between the microphone and the sound source; and generate audio correction information based on transmission characteristics from the sound source to the microphone, wherein the audio correction information is reverse characteristics of the transmission characteristics; and a position information generation unit configured to generate sound source position information based on microphone position information and the position correction information, wherein the sound source position information indicates a position of the sound source in a target space, and the microphone position information indicates a position of the microphone in the target space.

2. The signal processing device according to claim 1, further comprising an object sound source data generation unit configured to generate object sound source data that includes the sound source signal and metadata of the sound source signal, wherein the metadata includes the sound source position information and sound source type information, and the sound source type information indicates the type of the sound source.

3. The signal processing device according to claim 1, further comprising a microphone position information generation unit configured to generate the microphone position information based on information that indicates a position of the moving object in the target space and information indicating that indicates a position of the microphone in the moving object.

4. The signal processing device according to claim 2, wherein the correction information generation unit is further configured to generate direction correction information based on the recorded signal obtained by a plurality of microphones, wherein the direction correction information indicates a relative direction between the plurality of the microphones and the sound source, the signal processing device further includes a direction information generation unit configured to generate sound source direction information based on microphone direction information and the direction correction information, wherein the sound source direction information indicates a direction of the sound source in the target space, and the microphone direction information indicates a direction of each microphone of the plurality of microphones in the target space, and the object sound source data generation unit is further configured to generate the object sound source data that includes the sound source signal and the metadata, wherein the metadata includes the sound source type information, the sound source position information, and the sound source direction information.

5. The signal processing device according to claim 4, wherein the object sound source data generation unit is further configured to generate the object sound source data that includes the sound source signal and the metadata, wherein the metadata includes the sound source type information, identification information that indicates the moving object, the sound source position information, and the sound source direction information.

6. The signal processing device according to claim 1, wherein the audio generation unit is further configured to generate the sound source signal based on the audio correction information and the recorded signal.

7. The signal processing device according to claim 1, wherein the correction information generation unit is further configured to generate the audio correction information based on the transmission characteristics that is based on the type of the sound source.

8. The signal processing device according to claim 1, wherein the correction information generation unit is further configured to generate the audio correction information based on the transmission characteristics that is based on a relative direction between the microphone and the sound source.

9. The signal processing device according to claim 1, wherein the correction information generation unit is further configured to generate the audio correction information based on the transmission characteristics that is based on the distance between the microphone and the sound source.

10. A signal processing method, comprising:

in a signal processing device:

generating a sound source signal based on a recorded signal obtained by sound collection by a microphone attached to a moving object, wherein the sound source signal is generated based on a type of a sound source;

generating position correction information indicating a distance between the microphone and the sound source;

generating audio correction information based on transmission characteristics from the sound source to the microphone, wherein the audio correction information is reverse characteristics of the transmission characteristics; and generating sound source position information based on microphone position information and the position correction information, wherein the sound source position information indicates a position of the sound source in a target space, and the microphone position information indicates a position of the microphone in the target space.

11. A non-transitory computer-readable medium having stored thereon, computer-executable instructions which, when executed by a computer, cause the computer to execute operations, the operations comprising:

generating a sound source signal based on a recorded signal obtained by sound collection by a microphone attached to a moving object, wherein the sound source signal is generated based on a type of a sound source;

generating position correction information indicating a distance between the microphone and the sound source;

generating audio correction information based on transmission characteristics from the sound source to the microphone, wherein the audio correction information is reverse characteristics of the transmission characteristics; and generating sound source position information based on microphone position information and the position correction information, wherein the sound source position information indicates a position of the sound source in a target space, and the microphone position information indicates a position of the microphone in the target space.

* * * * *